US012216285B2

(12) United States Patent
Pedder et al.

(10) Patent No.: US 12,216,285 B2
(45) Date of Patent: Feb. 4, 2025

(54) USER INTERFACES FOR ADJUSTING A TUNABLE LENS

(71) Applicant: Apple Inc., Cupertino, CA (US)

(72) Inventors: James E Pedder, Oxon (GB); Gareth D Hastings, San Jose, CA (US); Igor Stamenov, San Ramon, CA (US); Matthew D Hollands, Cambridge (GB)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/427,527

(22) Filed: Jan. 30, 2024

(65) Prior Publication Data

US 2024/0302657 A1 Sep. 12, 2024

Related U.S. Application Data

(60) Provisional application No. 63/490,757, filed on Mar. 16, 2023, provisional application No. 63/489,127, filed on Mar. 8, 2023.

(51) Int. Cl.
*G02B 27/01* (2006.01)
*G02B 3/14* (2006.01)
*G02B 27/00* (2006.01)
*G06F 3/01* (2006.01)

(52) U.S. Cl.
CPC ........... *G02B 27/0172* (2013.01); *G02B 3/14* (2013.01); *G02B 27/0093* (2013.01); *G02B 27/0179* (2013.01); *G06F 3/013* (2013.01); *G02B 2027/0187* (2013.01)

(58) Field of Classification Search
None
See application file for complete search history.

(56) References Cited

U.S. PATENT DOCUMENTS

| 10,852,553 | B2 | 12/2020 | Pedder et al. |
| 10,928,638 | B2 | 2/2021 | Ninan et al. |
| 11,194,167 | B2 | 12/2021 | Lanman et al. |
| 11,363,946 | B2 | 6/2022 | Raviv et al. |
| 2009/0097113 | A1* | 4/2009 | Ansbro ................. G03B 21/62 359/457 |
| 2019/0346918 | A1* | 11/2019 | Akkaya .............. G02B 27/0075 |

(Continued)

FOREIGN PATENT DOCUMENTS

| KR | 20210150250 A | 12/2021 |
| KR | 20220120356 A | 8/2022 |

*Primary Examiner* — Parul H Gupta
(74) *Attorney, Agent, or Firm* — Treyz Law Group, P.C.; Joseph F. Guihan; Jinie M. Guihan

(57) ABSTRACT

An electronic device may include a display and a lens module through which the display is viewable. The lens module may include a tunable lens with an adjustable spherical power, cylindrical axis, and/or cylindrical power. To tune the tunable lens to compensate for a viewer's eyesight, the display may present at least one target. The optical power of the tunable lens may be set based on the point of gaze relative to the at least one target. Multiple targets with associated optical powers may be presented and the optical power of the tunable lens may be set depending on which target is aligned with the point of gaze. The display may present an image through a masking layer with a ring of pinhole pairs. The electronic device may include an input device that receives user input regarding a perceived image associated with the display and the masking layer.

23 Claims, 20 Drawing Sheets

(56) References Cited

U.S. PATENT DOCUMENTS

| | | |
|---|---|---|
| 2020/0008667 A1 | 1/2020 | Raviv et al. |
| 2020/0096770 A1 | 3/2020 | Pedder et al. |
| 2020/0174284 A1 | 6/2020 | Chan et al. |
| 2021/0330185 A1 | 10/2021 | Krukowski et al. |
| 2023/0036308 A1* | 2/2023 | Lee .................... A61B 3/04 |

* cited by examiner

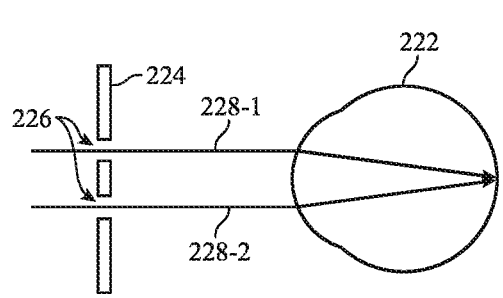 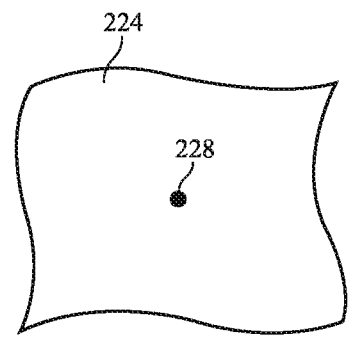
FIG. 14A              FIG. 14B
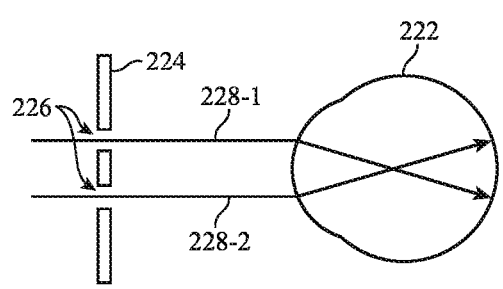 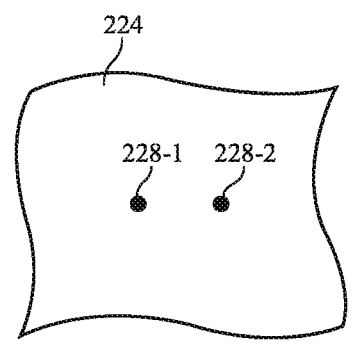
FIG. 15A              FIG. 15B
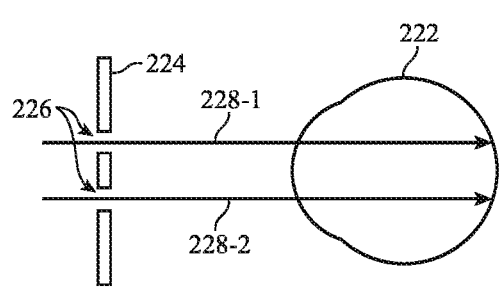 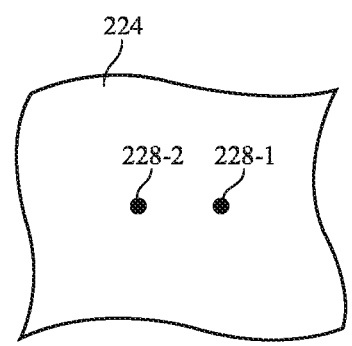
FIG. 16A              FIG. 16B

USER INTERFACES FOR ADJUSTING A TUNABLE LENS

This application claims the benefit of U.S. provisional patent application No. 63/490,757, filed Mar. 16, 2023, and U.S. provisional patent application No. 63/489,127, filed Mar. 8, 2023, which are hereby incorporated by reference herein in their entireties.

BACKGROUND

This relates generally to electronic devices and, more particularly, to wearable electronic device systems.

Electronic devices are sometimes configured to be worn by users. For example, head-mounted devices are provided with head-mounted structures that allow the devices to be worn on users' heads. The head-mounted devices may include optical systems with lenses. The lenses allow displays in the devices to present visual content to users.

Head-mounted devices typically include lenses with fixed shapes and properties. If care is not taken, it may be difficult to adjust these types of lenses to optimally present content to each user of the head-mounted device.

SUMMARY

An electronic device may include a display that is configured to present at least one target, a gaze detection sensor configured to determine a point of gaze, and a tunable lens through which the display is viewable. The tunable lens may be configured to set an optical power based on the point of gaze relative to the at least one target.

An electronic device may include a display configured to present an image through a masking layer with a ring of pinhole pairs, a tunable lens through which the display is viewable, and an input device configured to receive user input regarding a perceived image associated with the display and the masking layer.

A method of operating an electronic device with a display, a tunable lens that is aligned with the display, and a gaze detection sensor may include presenting multiple targets associated with respective spherical powers using the display, adjusting a spherical power of the tunable lens based on a point of gaze that is obtained using the gaze detection sensor, and receiving user input that identifies a preferred target of the multiple targets.

BRIEF DESCRIPTION OF THE DRAWINGS

FIG. 14A is a side view of an emmetropic eye viewing two beams of light in accordance with various embodiments.

FIG. 14B is a view of the image perceived by the eye in FIG. 14A in accordance with various embodiments.

FIG. 15A is a side view of a myopic eye viewing two beams of light in accordance with various embodiments.

FIG. 15B is a view of the image perceived by the eye in FIG. 15A in accordance with various embodiments.

FIG. 16A is a side view of a hyperopic eye viewing two beams of light in accordance with various embodiments.

FIG. 16B is a view of the image perceived by the eye in FIG. 16A in accordance with various embodiments.

DETAILED DESCRIPTION

Electronic devices may include displays and other components for presenting content to users. The electronic devices may be wearable electronic devices. A wearable electronic device such as a head-mounted device may have head-mounted support structures that allow the head-mounted device to be worn on a user's head.

A head-mounted device may contain a display formed from one or more display panels (displays) for displaying visual content to a user. A lens system may be used to allow the user to focus on the display and view the visual content. The lens system may have a left lens module that is aligned with a user's left eye and a right lens module that is aligned with a user's right eye.

In some cases, the user may wish to view real-world content rather than a display. The user may require different optical prescriptions depending on the distance to an object, the degree to which the user's eyes are verging (which may be related to the distance to the object viewed), lighting conditions, and/or other factors. The head-mounted device may contain lenses disposed in such a way as the real-world content is viewable through the lens system.

The lens modules in the head-mounted device may include lenses that are adjustable such as fluid-filled adjustable lenses.

Figure 1:
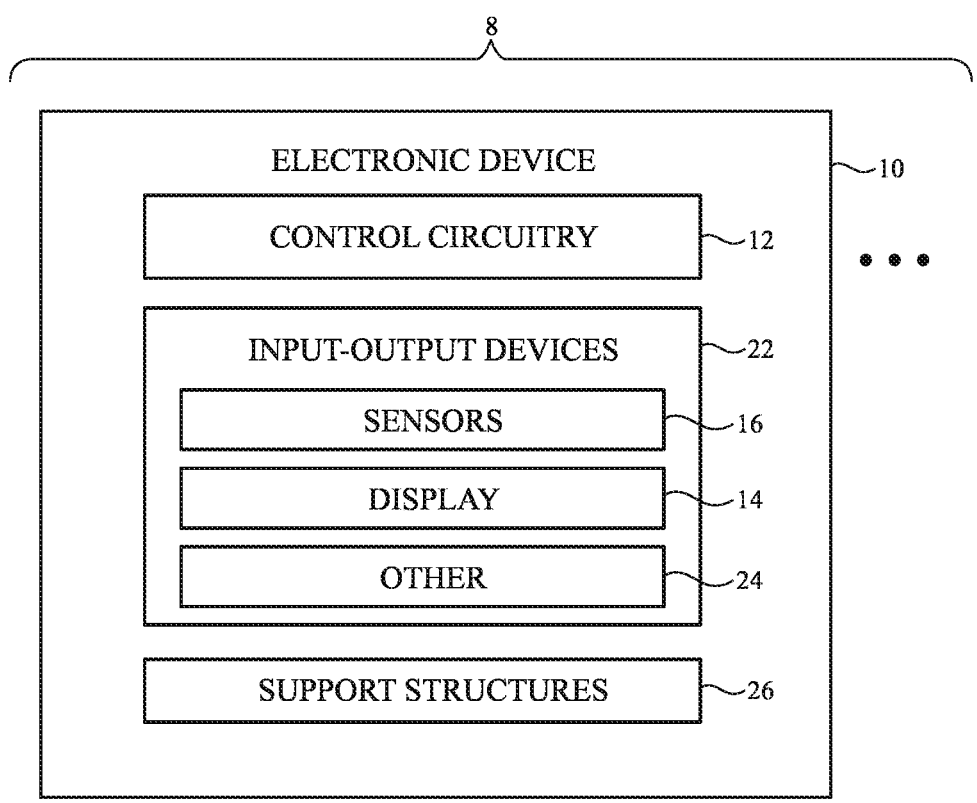
FIG. 1 is a schematic diagram of an illustrative electronic device such as a head-mounted device in accordance with various embodiments.

A schematic diagram of an illustrative system having an electronic device with a lens module is shown in FIG. 1. As shown in FIG. 1, system 8 may include one or more electronic devices such as electronic device 10. The electronic devices of system 8 may include computers, cellular telephones, head-mounted devices, wristwatch devices, and other electronic devices. Configurations in which electronic device 10 is a head-mounted device are sometimes described herein as an example.

As shown in FIG. 1, electronic devices such as electronic device 10 may have control circuitry 12. Control circuitry 12 may include storage and processing circuitry for controlling the operation of device 10. Circuitry 12 may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 12 may be based on one or more microprocessors, microcontrollers, digital signal processors, baseband processors, power management units, audio chips, graphics processing units, application specific integrated circuits, and other integrated circuits. Software code may be stored on storage in circuitry 12 and run on processing circuitry in circuitry 12 to implement control operations for device 10 (e.g., data gathering operations, operations involved in processing three-dimensional facial image data, operations involving the adjustment of components using control signals, etc.). Control circuitry 12 may include wired and wireless communications circuitry. For example, control circuitry 12 may include radio-frequency transceiver circuitry such as cellular telephone transceiver circuitry, wireless local area network (WiFi®) transceiver circuitry, millimeter wave transceiver circuitry, and/or other wireless communications circuitry.

During operation, the communications circuitry of the devices in system 8 (e.g., the communications circuitry of control circuitry 12 of device 10), may be used to support communication between the electronic devices. For example, one electronic device may transmit video and/or audio data to another electronic device in system 8. Electronic devices in system 8 may use wired and/or wireless communications circuitry to communicate through one or more communications networks (e.g., the internet, local area networks, etc.). The communications circuitry may be used to allow data to be received by device 10 from external equipment (e.g., a tethered computer, a portable device such as a handheld device or laptop computer, online computing equipment such as a remote server or other remote computing equipment, or other electrical equipment) and/or to provide data to external equipment.

Device 10 may include input-output devices 22. Input-output devices 22 may be used to allow a user to provide device 10 with user input. Input-output devices 22 may also be used to gather information on the environment in which device 10 is operating. Output components in devices 22 may allow device 10 to provide a user with output and may be used to communicate with external electrical equipment.

As shown in FIG. 1, input-output devices 22 may include one or more displays such as display 14. In some configurations, display 14 of device 10 includes left and right display panels (sometimes referred to as left and right portions of display 14 and/or left and right displays) that are in alignment with the user's left and right eyes, respectively. In other configurations, display 14 includes a single display panel that extends across both eyes. The example of device 10 including a display is merely illustrative and display(s) 14 may be omitted from device 10 if desired. Device 10 may include an optical pass-through area where real-world content is viewable to the user either directly or through a tunable lens.

Display 14 may be used to display images. The visual content that is displayed on display 14 may be viewed by a user of device 10. Displays in device 10 such as display 14 may be organic light-emitting diode displays or other displays based on arrays of light-emitting diodes, liquid crystal displays, liquid-crystal-on-silicon displays, projectors or displays based on projecting light beams on a surface directly or indirectly through specialized optics (e.g., digital micromirror devices), electrophoretic displays, plasma displays, electrowetting displays, or any other suitable displays.

Input-output circuitry 22 may include sensors 16. Sensors 16 may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible digital image sensors), gaze tracking sensors (e.g., a gaze tracking system based on an image sensor and, if desired, a light source that emits one or more beams of light that are tracked using the image sensor after reflecting from a user's eyes), touch sensors, buttons, force sensors, sensors such as contact sensors based on switches, gas sensors, pressure sensors, moisture sensors, magnetic sensors, audio sensors (microphones), ambient light sensors, microphones for gathering voice commands and other audio input, sensors that are configured to gather information on motion, position, and/or orientation (e.g., accelerometers, gyroscopes, compasses, and/or inertial measurement units that include all of these sensors or a subset of one or two of these sensors), fingerprint sensors and other biometric sensors, optical position sensors (optical encoders), and/or other position sensors such as linear position sensors, and/or other sensors. Sensors 16 may include proximity sensors (e.g., capacitive proximity sensors, light-based (optical) proximity sensors, ultrasonic proximity sensors, and/or other proximity sensors). Proximity sensors may, for example, be used to sense relative positions between a user's nose and lens modules in device 10.

User input and other information may be gathered using sensors and other input devices in input-output devices 22. If desired, input-output devices 22 may include other devices 24 such as haptic output devices (e.g., vibrating components), light-emitting diodes and other light sources, speakers such as ear speakers for producing audio output, and other electrical components. Device 10 may include circuits for receiving wireless power, circuits for transmitting power wirelessly to other devices, batteries and other energy storage devices (e.g., capacitors), joysticks, buttons, and/or other components.

Electronic device 10 may have housing structures (e.g., housing walls, straps, etc.), as shown by illustrative support structures 26 of FIG. 1. In configurations in which electronic device 10 is a head-mounted device (e.g., a pair of glasses, goggles, a helmet, a hat, etc.), support structures 26 may include head-mounted support structures (e.g., a helmet housing, head straps, temples in a pair of eyeglasses, goggle housing structures, and/or other head-mounted structures). The head-mounted support structures may be configured to be worn on a head of a user during operation of device 10 and may support display(s) 14, sensors 16, other components 24, other input-output devices 22, and control circuitry 12.

Figure 2:
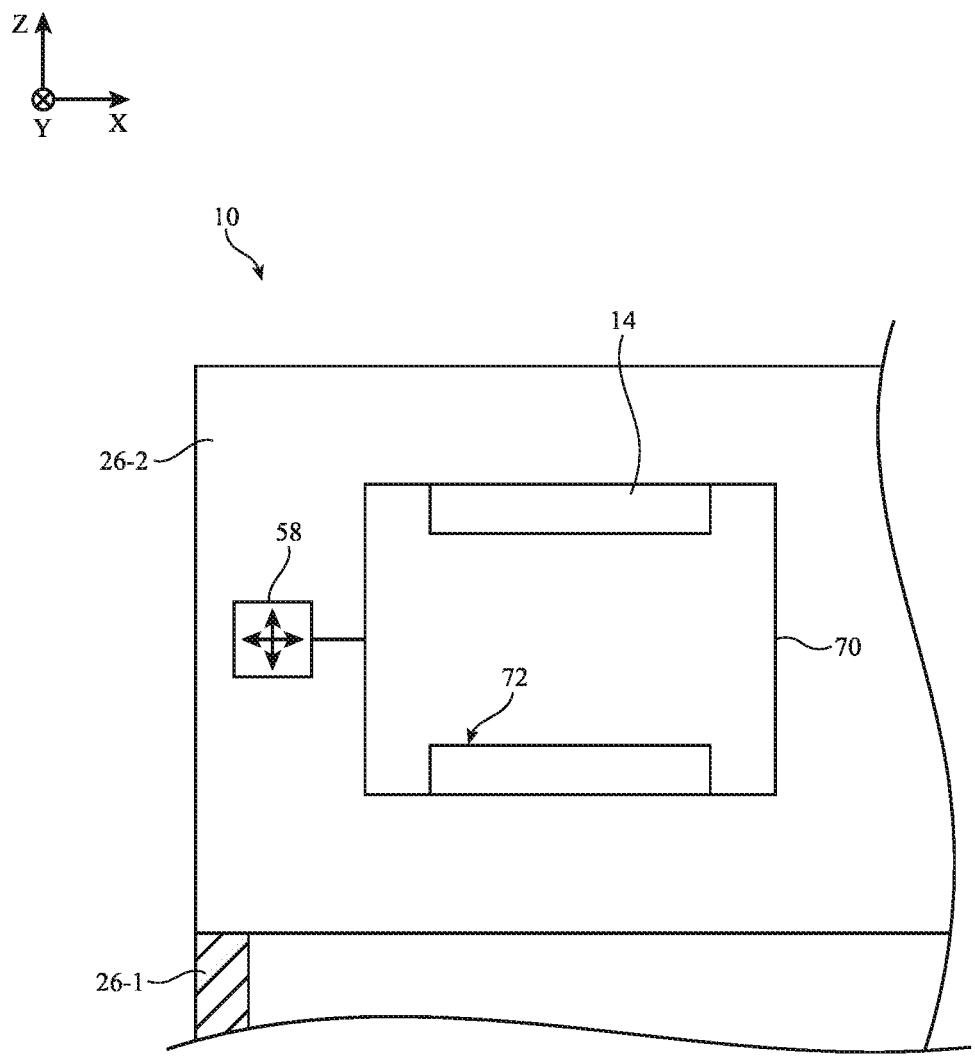
FIG. 2 is a top view of an illustrative head-mounted device in accordance with various embodiments.

FIG. 2 is a top view of electronic device 10 in an illustrative configuration in which electronic device 10 is a head-mounted device. As shown in FIG. 2, electronic device 10 may include support structures (see, e.g., support structures 26 of FIG. 1) that are used in housing the components of device 10 and mounting device 10 onto a user's head. These support structures may include, for example, structures that form housing walls and other structures for main unit 26-2 (e.g., exterior housing walls, lens module structures, etc.) and straps or other supplemental support structures such as structures 26-1 that help to hold main unit 26-2 on a user's face.

Display 14 may include left and right display panels (e.g., left and right pixel arrays, sometimes referred to as left and right displays or left and right display portions) that are mounted respectively in left and right display modules 70 corresponding respectively to a user's left eye and right eye. A display module corresponding the user's left eye is shown in FIG. 2.

Each display module 70 includes a display portion 14 and a corresponding lens module 72 (sometimes referred to as lens stack-up 72, lens 72, or adjustable lens 72). Lens 72 may include one or more lens elements arranged along a common axis. Each lens element may have any desired shape and may be formed from any desired material (e.g., with any desired refractive index). The lens elements may have unique shapes and refractive indices that, in combination, focus light from display 14 in a desired manner. Each lens element of lens module 72 may be formed from any desired material (e.g., glass, a polymer material such as polycarbonate or acrylic, a crystal such as sapphire, etc.).

Modules 70 may optionally be individually positioned relative to the user's eyes and relative to some of the housing wall structures of main unit 26-2 using positioning circuitry such as positioner 58. Positioner 58 may include stepper motors, piezoelectric actuators, motors, linear electromagnetic actuators, and/or other electronic components for adjusting the position of displays 14 and lens modules 72. Positioners 58 may be controlled by control circuitry 12 during operation of device 10. For example, positioners 58 may be used to adjust the spacing between modules 70 (and therefore the lens-to-lens spacing between the left and right lenses of modules 70) to match the interpupillary distance IPD of a user's eyes or to align the optical axis of a lens module 72 with the center of the pupil of a user's eye. Positioners 58 may adjust the shape of one or more adjustable lenses in lens module 72.

In some cases, the distance between lens module 72 and display 14 is variable. For example, the distance between the lens module and the display may be adjusted to account for the eyesight of a particular user. In another example, the lens module may include an adjustable lens element. The curvature of the adjustable lens element may be adjusted in real time to compensate for a user's visual requirements, as one example.

The example in FIG. 2 of the device including display modules is merely illustrative. As previously mentioned, the displays may be omitted from device 10 if desired. In this type of arrangement, the device may still include one or more lens modules 72 (e.g., through which the user views the real world). In this type of arrangement, real-world content may be focused for a user who would otherwise need visual assistance, including reading glasses, bifocals, etc.

Figure 3:
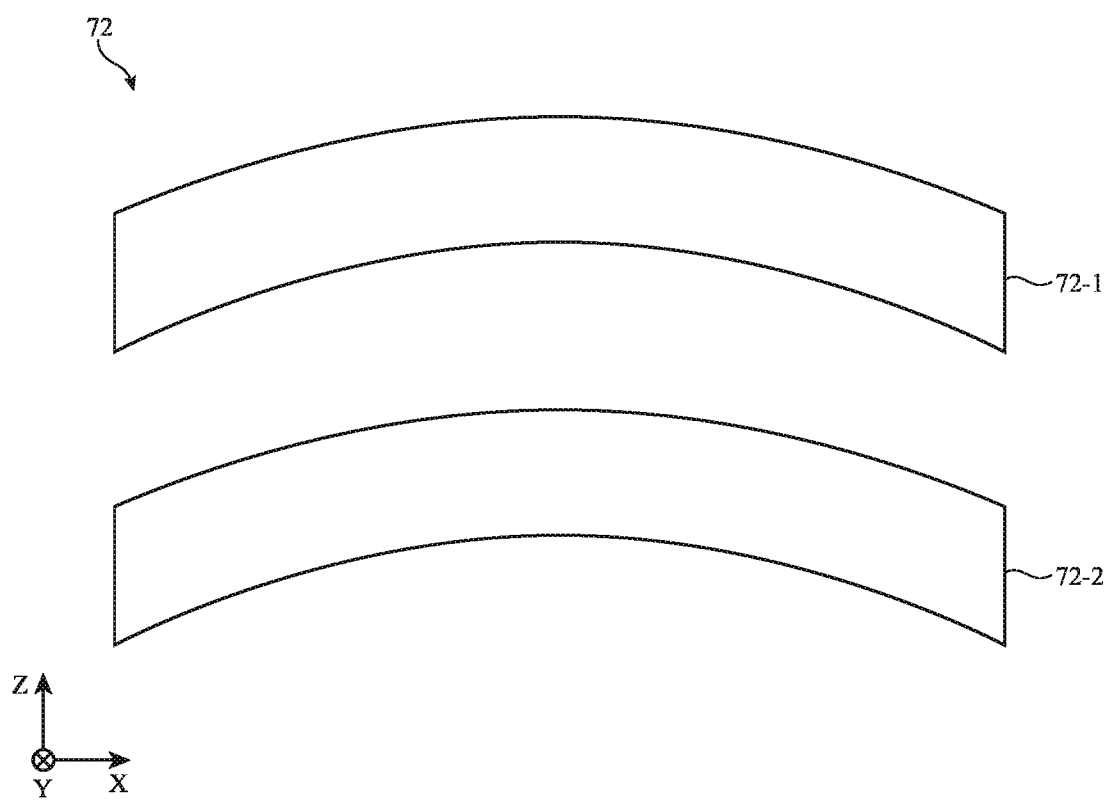
FIG. 3 is a cross-sectional side view of an illustrative lens module with first and second lens elements in accordance with various embodiments.

FIG. 3 is a cross-sectional side view of an illustrative lens module with multiple lens elements. As shown, lens module 72 includes a first lens element 72-1 and a second lens element 72-2. Each surface of the lens elements may have any desired curvature. For example, each surface may be a convex surface (e.g., a spherically convex surface, a cylindrically convex surface, or an aspherically convex surface), a concave surface (e.g., a spherically concave surface, a cylindrically concave surface, or an aspherically concave surface), a combination of convex and concave surfaces, or a freeform surface. A spherically curved surface (e.g., a spherically convex or spherically concave surface) may have a constant radius of curvature across the surface. In contrast, an aspherically curved surface (e.g., an aspheric concave surface or an aspheric convex surface) may have a varying radius of curvature across the surface. A cylindrical surface may only be curved about one axis instead of about multiple axes as with the spherical surface. In some cases, one of the lens surfaces may have an aspheric surface that changes from being convex (e.g., at the center) to concave (e.g., at the edges) at different positions on the surface. This type of surface may be referred to as an aspheric surface, a primarily convex (e.g., the majority of the surface is convex and/or the surface is convex at its center) aspheric surface, a freeform surface, and/or a primarily convex (e.g., the majority of the surface is convex and/or the surface is convex at its center) freeform surface. A freeform surface may include both convex and concave portions and/or curvatures defined by polynomial series and expansions. Alternatively, a freeform surface may have varying convex curvatures or varying concave curvatures (e.g., different portions with different radii of curvature, portions with curvature in one direction and different portions with curvature in two directions, etc.). Herein, a freeform surface that is primarily convex (e.g., the majority of the surface is convex and/or the surface is convex at its center) may sometimes still be referred to as a convex surface and a freeform surface that is primarily concave (e.g., the majority of the surface is concave and/or the surface is concave at its center) may sometimes still be referred to as a concave surface. In one example, shown in FIG. 3, lens element 72-1 has a convex surface that faces display 14 and an opposing concave surface. Lens element 72-2 has a convex surface that faces lens element 72-1 and an opposing concave surface.

One or both of lens elements 72-1 and 72-2 may be adjustable. In one example, lens element 72-1 is a fixed (e.g., non-adjustable) lens element whereas lens element 72-2 is an adjustable lens element. The adjustable lens element 72-2 may be used to accommodate a user's eyeglass prescription, for example. The shape of lens element 72-2 may be adjusted if a user's eyeglass prescription changes (without needing to replace any of the other components within device 10). As another possible use case, a first user with a first eyeglass prescription (or no eyeglass prescription) may use device 10 with lens element 72-2 having a first shape and a second, different user with a second eyeglass prescription may use device 10 with lens element 72-2 having a second shape that is different than the first shape. Lens element 72-2 may have varying lens power and/or may provide varying amounts and orientations of astigmatism correction to provide prescription correction for the user.

The example of lens module 72 including two lens elements is merely illustrative. In general, lens module 72 may include any desired number of lens elements (e.g., one, two, three, four, more than four, etc.). Any subset or all of the lens elements may optionally be adjustable. Any of the adjustable lens elements in the lens module may optionally be fluid-filled adjustable lenses. Lens module 72 may also include any desired additional optical layers (e.g., partially reflective mirrors that reflect 50% of incident light, linear polarizers, retarders such as quarter wave plates, reflective polarizers, circular polarizers, reflective circular polarizers, etc.) to manipulate light that passes through lens module.

As previously mentioned, one or more of the adjustable lens elements may be a fluid-filled lens element. An example is described herein where lens element 72-2 from FIG. 3 is a fluid-filled lens element. When lens element 72-2 is a fluid-filled lens element, the lens element may include one or more components that define the surfaces of lens element 72-2. These elements may also be referred to a lens elements. In other words, adjustable lens element 72-2 (sometimes referred to as adjustable lens module 72-2, adjustable lens 72-2, tunable lens 72-2, etc.) may be formed by multiple respective lens elements.

Figure 4:
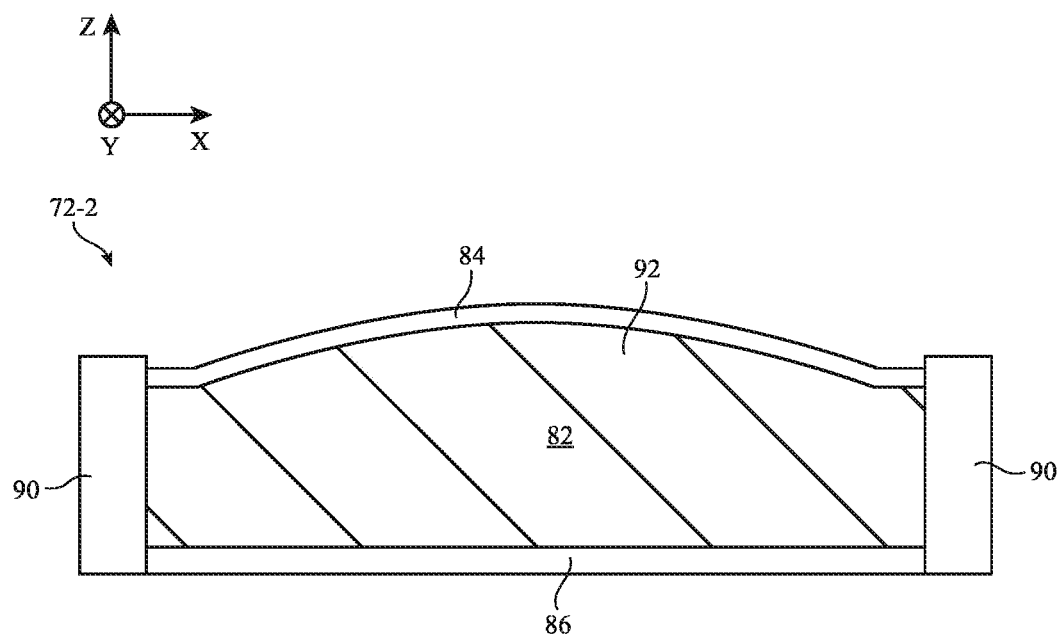
FIGS. 4 and 5 are cross-sectional side views of an illustrative fluid-filled lens element in accordance with various embodiments.

FIG. 4 is a cross-sectional side view of adjustable fluid-filled lens element 72-2. As shown, fluid-filled chamber 82 (sometimes referred to as chamber 82 or fluid chamber 82) that includes fluid 92 is interposed between lens elements 84 and 86. Fluid 92 may be a liquid, gel, or gas with a pre-determined index of refraction (and may therefore sometimes be referred to as liquid 92, gel 92, or gas 92). The fluid may sometimes be referred to as an index-matching oil, an optical oil, an optical fluid, an index-matching material, an index-matching liquid, etc. Lens elements 84 and 86 may have the same index of refraction or may have different indices of refraction. Fluid 92 that fills chamber 82 between lens elements 84 and 86 may have an index of refraction that is the same as the index of refraction of lens element 84 but different from the index of refraction of lens element 86, may have an index of refraction that is the same as the index of refraction of lens element 86 but different from the index of refraction of lens element 84, may have an index of refraction that is the same as the index of refraction of lens element 84 and lens element 86, or may have an index of refraction that is different from the index of refraction of lens element 84 and lens element 86. Lens elements 84 and 86 may have a circular footprint, may have an elliptical footprint, may have or may have a footprint any another desired shape (e.g., an irregular footprint).

The amount of fluid 92 in chamber 82 may have a constant volume or an adjustable volume. If the amount of fluid is adjustable, the lens module may also include a fluid reservoir and a fluid controlling component (e.g., a pump, stepper motor, piezoelectric actuator, motor, linear electromagnetic actuator, and/or other electronic component that applies a force to the fluid in the fluid reservoir) for selectively transferring fluid between the fluid reservoir and the chamber.

Lens elements 84 and 86 may be transparent lens elements formed from any desired material (e.g., glass, a polymer material such as polycarbonate or acrylic, a crystal such as sapphire, etc.). Each one of lens elements 84 and 86 may be elastomeric, semi-rigid, or rigid. Elastomeric lens elements may be formed from a natural or synthetic polymer that has a low Young's modulus for high flexibility. For example the elastomeric membrane may be formed from a material having a Young's modulus of less than 1 GPa, less than 0.5 GPa, less than 0.1 GPa, etc.

Semi-rigid lens elements may be formed from a semi-rigid material that is stiff and solid, but not inflexible. A semi-rigid lens element may, for example, be formed from a thin layer of polymer or glass. Semi-rigid lens elements may be formed from a material having a Young's modulus that is greater than 1 Gpa, greater than 2 GPa, greater than 3 GPa, greater than 10 GPa, greater than 25 GPa, etc. Semi-rigid lens elements may be formed from polycarbonate, polyethylene terephthalate (PET), polymethylmethacrylate (PMMA), acrylic, glass, or any other desired material. The properties of semi-rigid lens elements may result in the lens element becoming rigid along a first axis when the lens element is curved along a second axis perpendicular to the first axis or, more generally, for the product of the curvature along its two principal axes of curvature to remain roughly constant as it flexes. This is in contrast to an elastomeric lens element, which remains flexible along a first axis even when the lens element is curved along a second axis perpendicular to the first axis. The properties of semi-rigid lens elements may allow the semi-rigid lens elements to form a cylindrical lens with tunable lens power and a tunable axis.

Rigid lens elements may be formed from glass, a polymer material such as polycarbonate or acrylic, a crystal such as sapphire, etc. In general, the rigid lens elements may not deform when pressure is applied to the lens elements within the lens module. In other words, the shape and position of the rigid lens elements may be fixed. Each surface of a rigid lens element may be planar, concave (e.g., spherically, aspherically, or cylindrically concave), or convex (e.g., spherically, aspherically, or cylindrically convex). Rigid lens elements may be formed from a material having a Young's modulus that is greater than 25 GPa, greater than 30 GPa, greater than 40 GPa, greater than 50 GPa, etc.

One or more structures such as a lens housing 90 (sometimes referred to as housing 90, lens chassis 90, chassis 90, support structure 90, etc.) may also define the fluid-filled chamber 82 of lens element 72-2.

Figure 5:
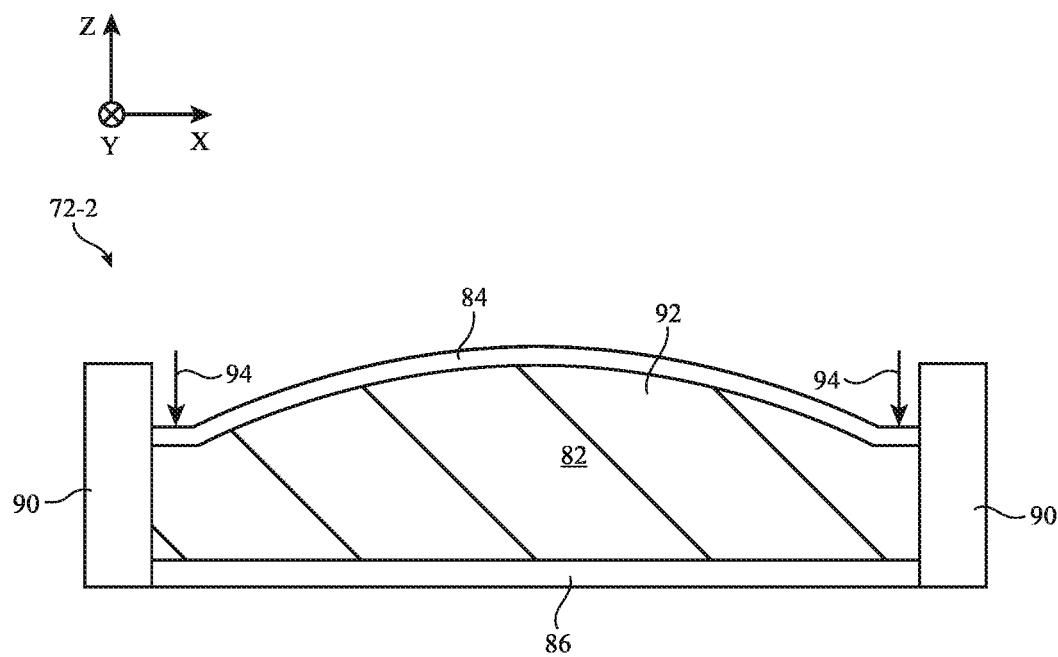

FIG. 5 is a cross-sectional side view of lens element 72-2 showing an illustrative adjustment of the shape of lens element 72-2. As shown, during adjustments of lens element 72-2, lens element 84 may be biased in direction 94 at multiple points along its periphery (e.g., a point force is applied in direction 94 at multiple points). In this way, the curvature of the lens element 84 (and accordingly, the lens power of lens element 72-2) may be adjusted.

There are multiple options for how to manipulate the shape of lens element 84. In one possible arrangement, a plurality of actuators (e.g., linear actuators) may be coupled to the periphery of the lens element. The actuators may be distributed evenly around the periphery of the lens element 84, as one example. Each actuator (e.g., a linear actuator) may be coupled to a respective portion of lens element 84 and may selectively move that respective portion of lens element 84 up and down (e.g., in the Z-direction in FIGS. 4 and 5) to control the position of that respective portion of lens element 84 in the Z-direction. A lens shaping element (e.g., a ring-shaped element) may optionally be coupled to both lens element 84 and the actuators.

It may be desirable to adjust adjustable lens element 72-2 to compensate for a user's eyesight. A user with an up-to-date eyeglass prescription may use the eyeglass prescription to compensate for their eyesight. In one possible arrangement, a user may provide their eyeglass prescription to electronic device 10 manually (e.g., by typing the eyeglass prescription into electronic device 10 using an input device in electronic device 10) and control circuitry 12 in electronic device 10 may update the adjustable lens accordingly. However, this process may take longer than desired. To update the adjustable lens element 72-2 to compensate for a user's eyesight (even when their eyeglass prescription is not known), electronic device 10 may provide a user interface for allowing the user to tune the adjustable lens element.

Figure 6:
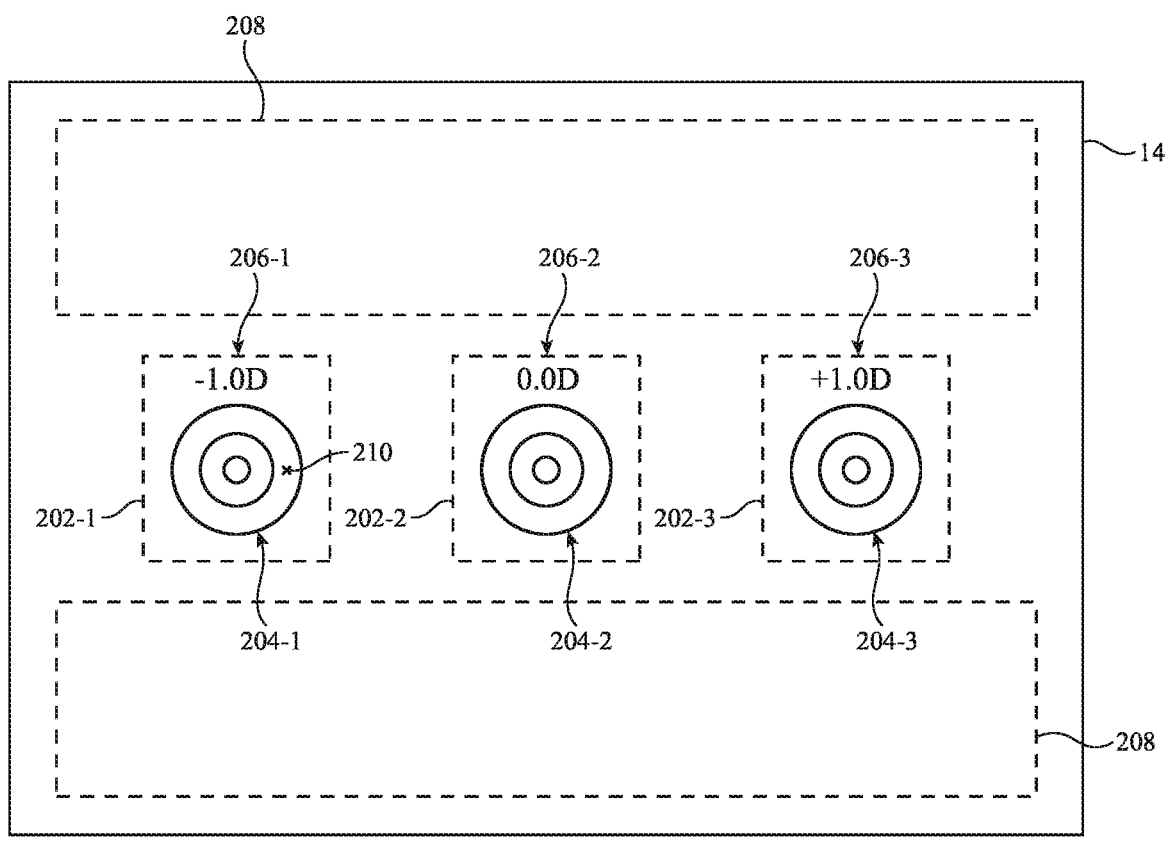
FIG. 6 is a top view of an illustrative display that presents multiple targets associated with respective spherical powers in accordance with various embodiments.

FIG. 6 shows an example of a user interface that may be used to adjust the spherical power of the tunable lens in response to input from the user. As shown in FIG. 6, a first target 204-1 (sometimes referred to as an optical marker 204-1, optical target 204-1, symbol 204-1, etc.) is presented in region 202-1 alongside text description 206-1. A second target 204-2 (sometimes referred to as an optical marker 204-2, optical target 204-2, symbol 204-2, etc.) is presented in region 202-2 alongside text description 206-2. A third target 204-3 (sometimes referred to as an optical marker 204-3, optical target 204-3, symbol 204-3, etc.) is presented in region 202-3 alongside text description 206-3.

The first target 204-1 may be associated with a first spherical power (that is listed in description 206-1). The second target 204-2 may be associated with a second spherical power (that is listed in description 206-2). The third target 204-3 may be associated with a third spherical power (that is listed in description 206-3).

The user of electronic device 10 may provide input that causes the tunable lens to switch between the first spherical power associated with the first target, the second spherical power associated with the second target, and the third spherical power associated with the third target. In one example, gaze input obtained by a gaze detection sensor may be used to set the spherical power in the tunable lens.

The gaze detection sensor may detect a direction of gaze of the user's eye. The direction of gaze may be used to determine a point of gaze on a display, as one example.

In FIG. 6, point of gaze 210 is aligned with region 202-1 including the first target 204-1. While the point of gaze is aligned with target 204-1 in region 202-1, the tunable lens may be adjusted to have the spherical power associated with target 204-1. If the user's gaze direction changes such that the point of gaze is aligned with target 204-2 in region 202-2, the tunable lens may be adjusted to have the spherical power associated with target 204-2. If the user's gaze direction changes such that the point of gaze is aligned with target 204-3 in region 202-3, the tunable lens may be adjusted to have the spherical power associated with target 204-3.

In the example of FIG. 6, target 204-1 is associated with a spherical power of −1.0 D (which is listed in description 206-1), target 204-2 is associated with a spherical power of 0.0 D (which is listed in description 206-2), and target 204-3 is associated with a spherical power of +1.0 D (which is listed in description 206-3). When the viewer looks at target 204-1, the tunable lens is adjusted to have a spherical power of −1.0 D. When the viewer looks at target 204-2, the tunable lens is adjusted to have a spherical power of 0.0 D. When the viewer looks at target 204-3, the tunable lens is adjusted to have a spherical power of +1.0 D.

With this type of arrangement, the user may intuitively and easily change the tunable lens between multiple spherical powers. After viewing each of the targets, the user may assess which target looks the clearest among the presented targets. The user may provide user input to select the target that appears the clearest. The electronic device may use the selected spherical power to determine the user's optimal spherical power during operation of the electronic device 10.

If desired, additional visual content such as content 208 may be presented on display 14 simultaneously with the targets 204. In general, content 208 may be a visual cue to influence the distance (depth) at which the user perceives the image content to be located. For example, content 208 (sometimes referred to as background content 208 or depth cue 208) may include one or more depth cues such as a horizon to suggest that the targets 204 are far away and cause the user's eye to relax accommodation. Instead or in addition, content 208 may include stereoscopic content that causes the user to perceive the image content at a desired distance.

Figure 7:
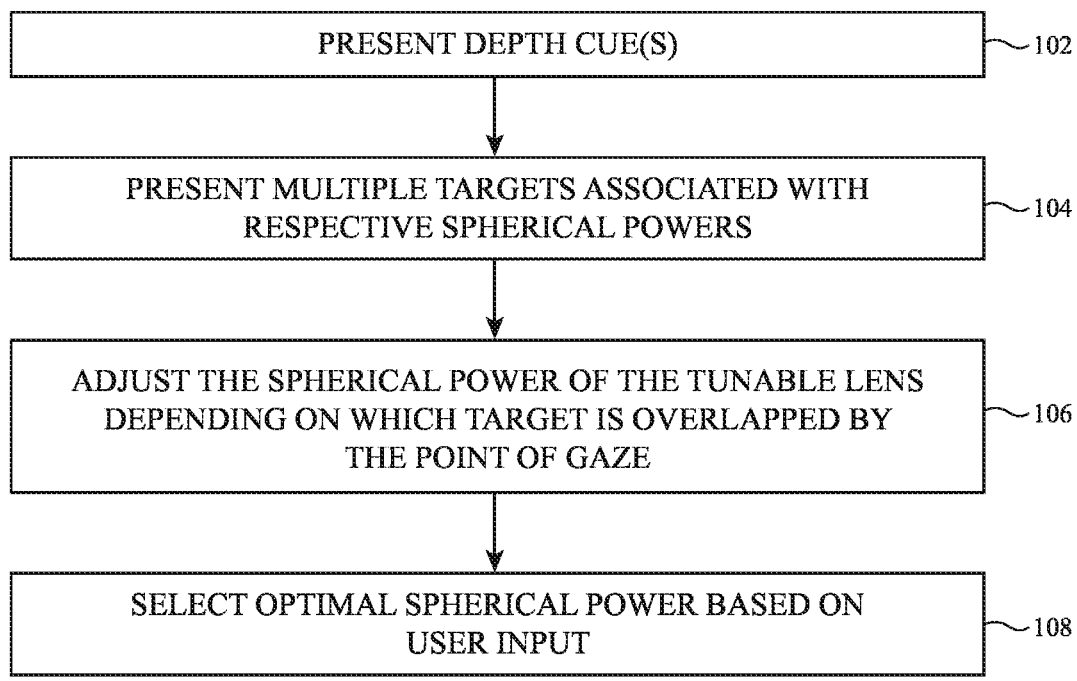
FIG. 7 is a flowchart of illustrative method steps for operating an electronic device with a tunable lens having adjustable spherical power in accordance with various embodiments.

FIG. 7 is a flowchart of illustrative method steps for operating an electronic device with a tunable lens having adjustable spherical power. First, at step 102, the electronic device 10 may present one or more depth cues to set a perceived image distance (sometimes referred to as perceived image depth). As previously mentioned, the depth cues may include a horizon, stereoscopic content, etc.

At step 104, display 14 may present multiple targets associated with respective spherical powers. Each target may be a bullseye, each target may include glyphs, and/or each target may include stripes (e.g., horizontal stripes, vertical stripes, and/or diagonal stripes, etc.). In general, the targets may have any desired appearance. Each target is associated with a respective unique spherical power. The respective spherical power may be displayed in a text description adjacent to the target if desired.

At step 106, a gaze detection sensor (sometimes referred to as a gaze tracking sensor) may determine the direction of gaze and/or the point of gaze of the viewer on display 14. Electronic device 10 (e.g., control circuitry 12) may adjust the spherical power of the tunable lens depending on which target is overlapped by the direction of gaze and/or the point of gaze. In the example of FIG. 6, the tunable lens is adjusted to have a spherical power of −1.0 D when the viewer looks at target 204-1, the tunable lens is adjusted to have a spherical power of 0.0 D when the viewer looks at target 204-2, and the tunable lens is adjusted to have a spherical power of +1.0 D when the viewer looks at target 204-3. If the user is not looking at any of the targets, the tunable lens may maintain the spherical power from the target most recently viewed or may revert back to a default spherical power.

The example in step 106 of the tunable lens being updated based on gaze input is merely illustrative. Alternatively, the user may provide touch input (e.g., to a touch sensor), voice commands (e.g., to a microphone), button input (e.g., to a button or digital crown), and/or other desired input to change a selected target. For example, a user may swipe a touch sensor to the right to cause a selected target to change from target 204-1 to target 204-2, may provide a voice command to cause a selected target to change from target 204-1 to target 204-2, may press a button to cause a selected target to change from target 204-1 to target 204-2, may rotate a button (e.g., a digital crown) to cause a selected target to change from target 204-1 to target 204-2, etc. The tunable lens is adjusted to have a spherical power of −1.0 D when target 204-1 is selected, the tunable lens is adjusted to have a spherical power of 0.0 D when target 204-2 is selected, and the tunable lens is adjusted to have a spherical power of +1.0 D when target 204-3 is selected.

Finally, in step 108, an optimal spherical power of the presented options may be selected based on user input. The user may select the spherical power that causes the target to have the clearest appearance. For example, the user may look at targets 204-1, 204-2, and 204-3. Target 204-1 may appear clear when viewed whereas targets 204-2 and 204-3 may appear blurry when viewed. Accordingly, the user provides user input to select target 204-1 as the best option available.

The user may select their preferred target using gaze input (e.g., by gazing at the preferred target for longer than a given dwell time), touch input, a voice command, button input (e.g., to a button or digital crown), etc.

The method of FIG. 7 may be repeated multiple times until the optimal spherical power for the user is determined. For example, in a first iteration the targets may have associated spherical powers of −1.0 D, 0.0 D, and +1.0 D. The user selects −1.0 D as the target appearing the most clear. In a second iteration the targets may have associated spherical powers of −1.0 D, −2.0 D, and −3.0 D. The user selects −2.0 D as the target appearing the clearest. In a third iteration the targets may have associated spherical powers of −1.5 D, −2.0 D, and −2.5 D. The user selects −2.0 D as the target appearing the clearest. In a fourth iteration the targets may have associated spherical powers of −1.75 D, −2.0 D, and −2.25 D. The user selects −1.75 D as the target appearing the clearest. This spherical power may be identified as the optimal spherical power for the user's eyesight.

In general, any desired number of iterations of FIG. 7 may be performed to narrow in on the optimal spherical power for the user's eyesight.

It is noted that the method of FIG. 7 may be performed for a single eye of the user (since each eye may have different optimal spherical powers). In the eye that is not being tested, display 14 may present a solid background image and/or may present content with a similar appearance as the eye being tested to avoid user discomfort.

During the operations of FIG. 7, the cylindrical power (and axis) may be kept constant. For example, the cylindrical power may be kept at 0.0 D throughout the multiple iterations of FIG. 7.

Figure 8:
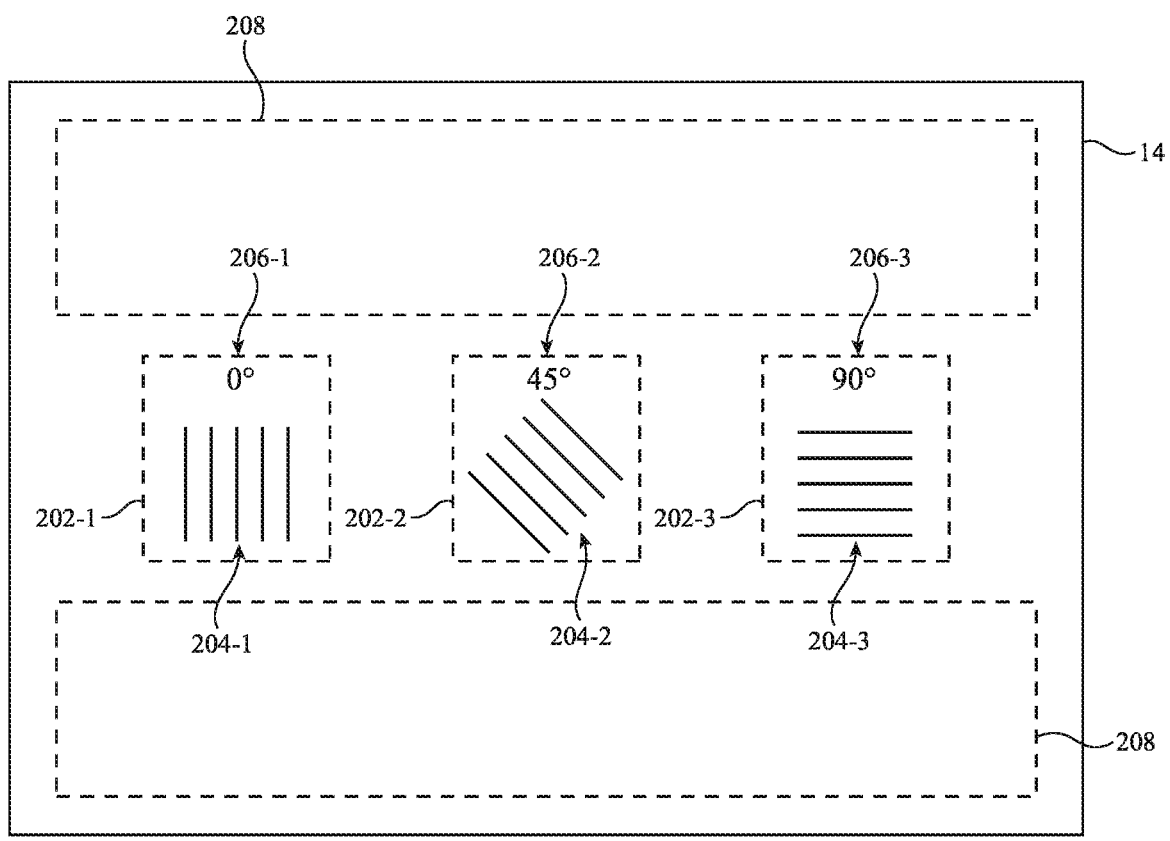
FIG. 8 is a top view of an illustrative display that presents multiple targets associated with respective cylindrical axes in accordance with various embodiments.

FIG. 8 shows an example of a user interface that may be used to select an optimal cylindrical axis for the tunable lens in response to input from the user. As shown in FIG. 8, a first target 204-1 (sometimes referred to as an optical marker 204-1, optical target 204-1, symbol 204-1, etc.) is presented in region 202-1 alongside text description 206-1. A second target 204-2 (sometimes referred to as an optical marker 204-2, optical target 204-2, symbol 204-2, etc.) is presented in region 202-2 alongside text description 206-2. A third target 204-3 (sometimes referred to as an optical marker 204-3, optical target 204-3, symbol 204-3, etc.) is presented in region 202-3 alongside text description 206-3.

The first target 204-1 may be associated with a first cylindrical axis (that is listed in description 206-1). The second target 204-2 may be associated with a second cylindrical axis (that is listed in description 206-2). The third target 204-3 may be associated with a third cylindrical axis (that is listed in description 206-3). As shown in FIG. 8, each target may include stripes that are oriented at an angle defined by the associated cylindrical axis.

The spherical power and the cylindrical power may be static during the assessment of FIG. 8. The optimal spherical power determined using the techniques described in connection with FIGS. 6 and 7 may be applied while assessing cylindrical axis in FIG. 8. After viewing all of the targets, the user may assess which target looks the clearest among the presented targets. The user may provide user input to select the target that appears the clearest. The electronic device may use the selected cylindrical axis to determine the user's optimal cylindrical axis during operation of the electronic device 10.

If desired, additional visual content such as content 208 may be presented on display 14 simultaneously with the targets 204. In general, content 208 may be a visual cue to influence the distance (depth) at which the user perceives the image content to be located. For example, content 208 (sometimes referred to as background content 208) may include one or more depth cues such as a horizon to suggest that the targets 204 are far away and cause the user's eye to relax accommodation. Instead or in addition, content 208 may include stereoscopic content that causes the user to perceive the image content at a desired distance.

Figure 9:
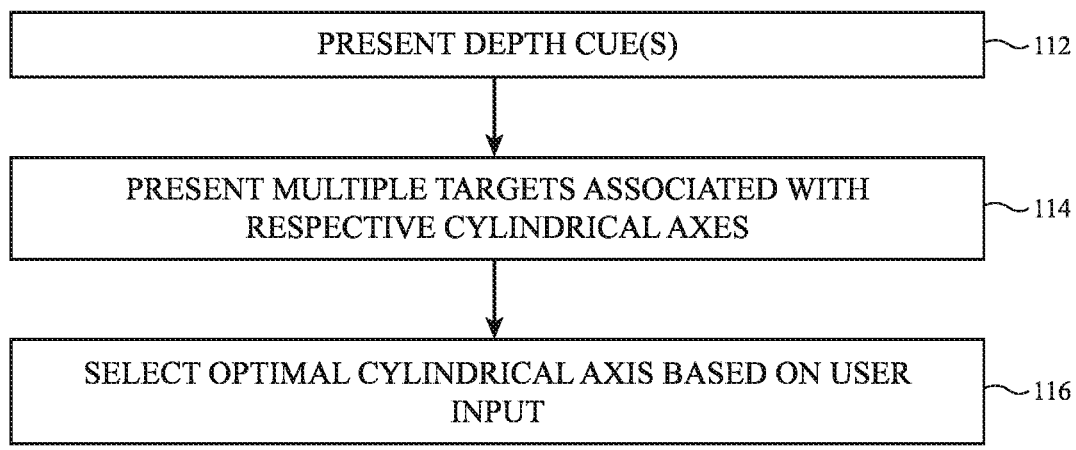
FIG. 9 is a flowchart of illustrative method steps for operating an electronic device with a tunable lens having an adjustable cylindrical axis in accordance with various embodiments.

FIG. 9 is a flowchart of illustrative method steps for operating an electronic device with a tunable lens having an adjustable cylindrical axis. First, at step 112, the electronic device 10 may present one or more depth cues to set a perceived image distance (sometimes referred to as perceived image depth). As previously mentioned, the depth cues may include a horizon, stereoscopic content, etc. At step 114, display 14 may present multiple targets associated with respective cylindrical axes. Each target may include stripes that are oriented at angles defined by the cylindrical axis associated with that target. In general, the targets may have any desired appearance. Each target is associated with a respective unique cylindrical axis. The respective cylindrical axis may be displayed in a text description adjacent to the target if desired.

Finally, in step 116, an optimal cylindrical axis of the presented options may be selected based on user input. The user may select the cylindrical axis that causes the target to have the clearest appearance. For example, the user may look at targets 204-1, 204-2, and 204-3. Target 204-1 may appear clear when viewed whereas targets 204-2 and 204-3 may appear blurry when viewed. Accordingly, the user provides user input to select target 204-1 as the best option available.

The user may select their preferred target using gaze input (e.g., by gazing at the preferred target for longer than a given dwell time), touch input, a voice command, button input (e.g., to a button or digital crown), etc.

The method of FIG. 9 may be repeated multiple times until the optimal cylindrical axis for the user is determined. In general, any desired number of iterations of FIG. 9 may be performed to narrow in on the optimal spherical power for the user's eyesight.

It is noted that the method of FIG. 9 may be performed for a single eye of the user (since each eye may have different optimal cylindrical axes). In the eye that is not being tested, display 14 may present a solid background image and/or may present content with a similar appearance as the eye being tested to avoid user discomfort.

During the operations of FIG. 9, the spherical power and the cylindrical power of the tunable lens may be kept constant.

Figure 10:
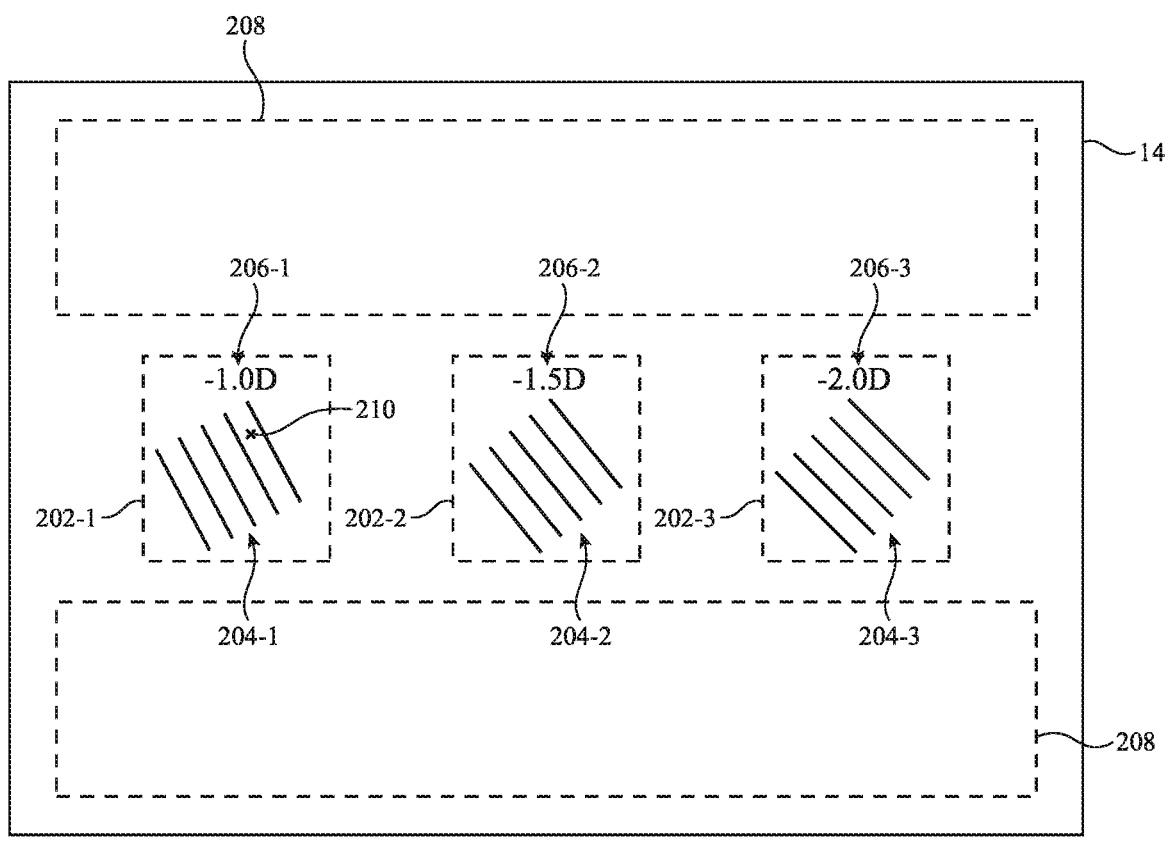
FIG. 10 is a top view of an illustrative display that presents multiple targets associated with respective cylindrical powers in accordance with various embodiments.

FIG. 10 shows an example of a user interface that may be used to adjust the cylindrical power of the tunable lens in response to input from the user. As shown in FIG. 10, a first target 204-1 (sometimes referred to as an optical marker 204-1, optical target 204-1, symbol 204-1, etc.) is presented in region 202-1 alongside text description 206-1. A second target 204-2 (sometimes referred to as an optical marker 204-2, optical target 204-2, symbol 204-2, etc.) is presented in region 202-2 alongside text description 206-2. A third target 204-3 (sometimes referred to as an optical marker 204-3, optical target 204-3, symbol 204-3, etc.) is presented in region 202-3 alongside text description 206-3.

The first target 204-1 may be associated with a first cylindrical power (that is listed in description 206-1). The second target 204-2 may be associated with a second cylindrical power (that is listed in description 206-2). The third target 204-3 may be associated with a third cylindrical power (that is listed in description 206-3).

The user of electronic device 10 may provide input that causes the tunable lens to switch between the first cylindrical power associated with the first target, the second cylindrical power associated with the second target, and the third cylindrical power associated with the third target. In one example, gaze input obtained by a gaze detection sensor may be used to set the cylindrical power of the tunable lens.

In FIG. 10, point of gaze 210 is aligned with region 202-1 including the first target 204-1. While the point of gaze is aligned with target 204-1 in region 202-1, the tunable lens may be adjusted to have the cylindrical power associated with target 204-1. If the user's gaze direction changes such that the point of gaze is aligned with target 204-2 in region 202-2, the tunable lens may be adjusted to have the cylindrical power associated with target 204-2. If the user's gaze direction changes such that the point of gaze is aligned with target 204-3 in region 202-3, the tunable lens may be adjusted to have the cylindrical power associated with target 204-3.

In the example of FIG. 10, target 204-1 is associated with a cylindrical power of −1.0 D (which is listed in description 206-1), target 204-2 is associated with a cylindrical power of −1.5 D (which is listed in description 206-2), and target 204-3 is associated with a cylindrical power of −2.0 D (which is listed in description 206-3). When the viewer looks at target 204-1, the tunable lens is adjusted to have a cylindrical power of −1.0 D. When the viewer looks at target 204-2, the tunable lens is adjusted to have a cylindrical power of −1.5 D. When the viewer looks at target 204-3, the tunable lens is adjusted to have a cylindrical power of −2.0 D.

With this type of arrangement, the user may intuitively and easily change the tunable lens between multiple cylindrical powers. After viewing all of the targets, the user may assess which target looks the clearest among the presented targets. The user may provide user input to select the target that appears the clearest. The electronic device may use the selected cylindrical power to determine the user's optimal cylindrical power during operation of the electronic device 10.

If desired, additional visual content such as content 208 may be presented on display 14 simultaneously with the targets 204. In general, content 208 may be a visual cue to influence the distance (depth) at which the user perceives the image content to be located. For example, content 208 (sometimes referred to as background content 208) may include one or more depth cues such as a horizon to suggest that the targets 204 are far away and cause the user's eye to relax accommodation. Instead or in addition, content 208 may include stereoscopic content that causes the user to perceive the image content at a desired distance.

Figure 11:
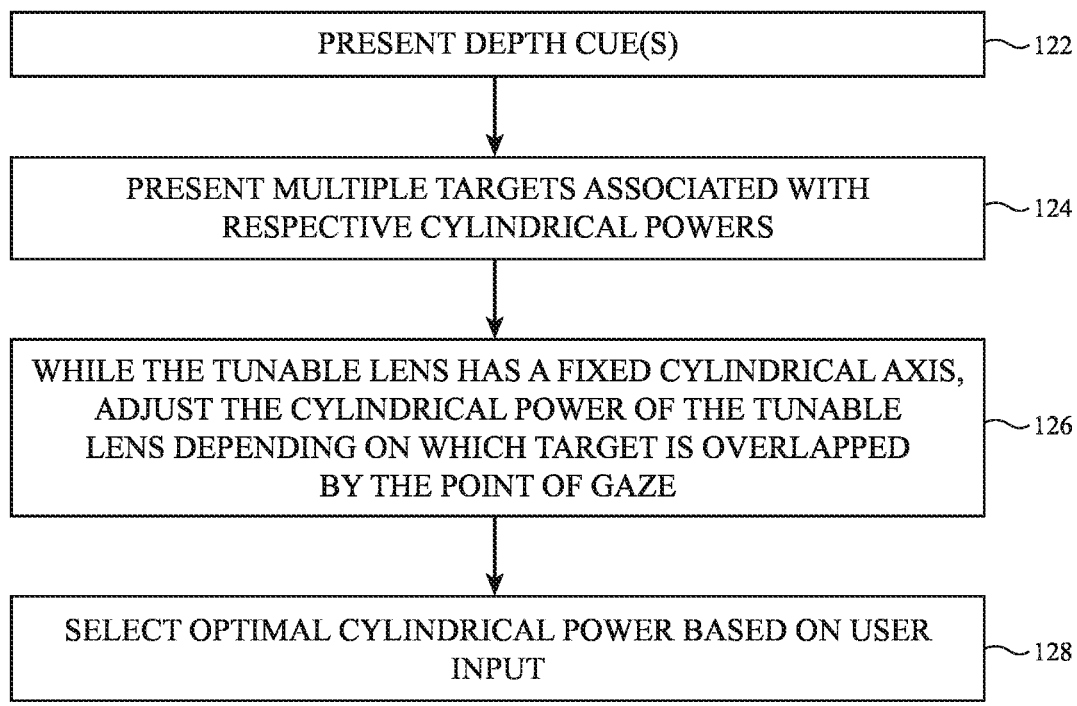
FIG. 11 is a flowchart of illustrative method steps for operating an electronic device with a tunable lens having adjustable cylindrical power using the targets of FIG. 10 in accordance with various embodiments.

FIG. 11 is a flowchart of illustrative method steps for operating an electronic device with a tunable lens having adjustable cylindrical power. First, at step 122, the electronic device 10 may present one or more depth cues to set a perceived image distance (sometimes referred to as perceived image depth). As previously mentioned, the depth cues may include a horizon, stereoscopic content, etc. At step 124, display 14 may present multiple targets associated with respective cylindrical powers. Each target may be a bullseye, each target may include glyphs, and/or each target may include stripes (e.g., horizontal stripes, vertical stripes, and/or diagonal stripes, etc.). In general, the targets may have any desired appearance. Each target is associated with a respective unique cylindrical power. The respective cylindrical power may be displayed in a text description adjacent to the target if desired.

At step 126, a gaze detection sensor (sometimes referred to as a gaze tracking sensor) may determine the point of gaze of the viewer on display 14. Electronic device 10 (e.g., control circuitry 12) may adjust the cylindrical power of the tunable lens depending on which target is overlapped by the point of gaze. In the example of FIG. 10, the tunable lens is adjusted to have a cylindrical power of −1.0 D when the viewer looks at target 204-1, the tunable lens is adjusted to have a cylindrical power of −1.5 D when the viewer looks at target 204-2, and the tunable lens is adjusted to have a cylindrical power of −2.0 D when the viewer looks at target 204-3. If the user is not looking at any of the targets, the tunable lens may maintain the cylindrical power from the target most recently viewed or may revert back to a default cylindrical power.

The example in step 126 of the tunable lens being updated based on gaze input is merely illustrative. Alternatively, the user may provide touch input (e.g., to a touch sensor), voice commands (e.g., to a microphone), button input (e.g., to a button or digital crown), and/or other desired input to change a selected target. For example, a user may swipe a touch sensor to the right to cause a selected target to change from target 204-1 to target 204-2, may provide a voice command to cause a selected target to change from target 204-1 to target 204-2, may press a button to cause a selected target to change from target 204-1 to target 204-2, may rotate a button (e.g., a digital crown) to cause a selected target to change from target 204-1 to target 204-2, etc. The tunable lens is adjusted to have a cylindrical power of −1.0 D when target 204-1 is selected, the tunable lens is adjusted to have a cylindrical power of −1.5 D when target 204-2 is selected, and the tunable lens is adjusted to have a cylindrical power of −2.0 D when target 204-3 is selected.

Finally, in step 128, an optimal cylindrical power of the presented options may be selected based on user input. The user may select the cylindrical power that causes the target to have the clearest appearance. For example, the user may look at targets 204-1, 204-2, and 204-3. Target 204-1 may appear clear when viewed whereas targets 204-2 and 204-3 may appear blurry when viewed. Accordingly, the user provides user input to select target 204-1 as the best option available.

The user may select their preferred target using gaze input (e.g., by gazing at the preferred target for longer than a given dwell time), touch input, a voice command, button input (e.g., to a button or digital crown), etc.

The method of FIG. 11 may be repeated multiple times until the optimal cylindrical power for the user is determined. For example, in a first iteration the targets may have associated spherical powers of −1.0 D, −1.5 D, and −2.0 D. The user selects −1.5 D as the target appearing the clearest. In a second iteration the targets may have associated spherical powers of −1.25 D, −1.5 D, and 1.75 D. The user selects −1.5 D as the target appearing the clearest. In a third iteration the targets may have associated spherical powers of −1.4 D, −1.5 D, and −1.6 D. The user selects −1.4 D as the target appearing the clearest. This cylindrical power may be identified as the optimal cylindrical power for the user's eyesight.

In general, any desired number of iterations of FIG. 11 may be performed to narrow in on the optimal cylindrical power for the user's eyesight.

It is noted that the method of FIG. 11 may be performed for a single eye of the user (since each eye may have different optimal cylindrical powers). In the eye that is not being tested, display 14 may present a solid background image and/or may present content with a similar appearance as the eye being tested to avoid user discomfort.

During the operations of FIG. 11, the spherical power and cylindrical axis may be kept constant.

In FIGS. 6, 8, and 10, discrete targets are displayed with at least one associated unique property (e.g., an associated unique spherical power in FIG. 6, an associated unique cylindrical axis in FIG. 8, and an associated unique cylindrical power in FIG. 10). This example is merely illustrative. In another possible embodiment, shown in FIG. 12, a target may be presented that is associated with a continuous range of values for a particular property.

Figure 12:
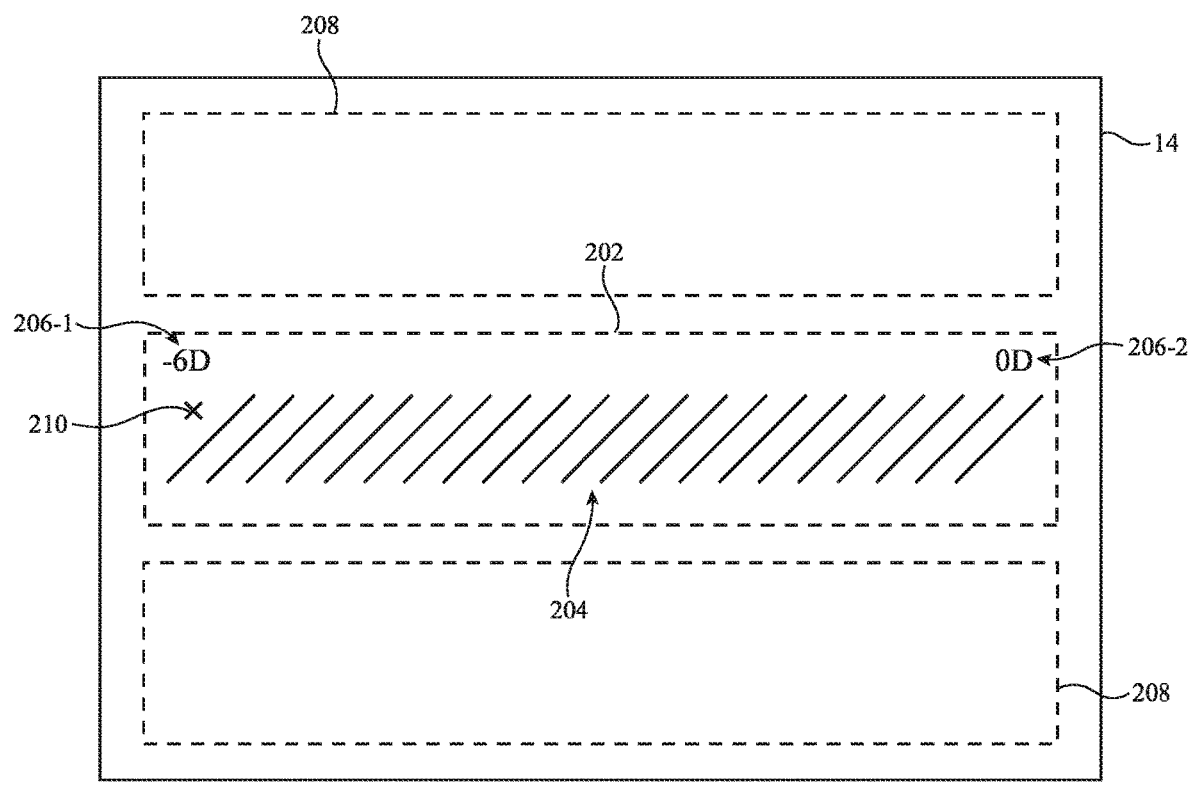
FIG. 12 is a top view of an illustrative display that presents a single target associated with a range of optical power in accordance with various embodiments.

As shown in FIG. 12, a target 204 (sometimes referred to as an optical marker 204, optical target 204, symbol 204, etc.) may be presented in region 202 alongside text descriptions 206-1 and 206-2. Target 204 may comprise stripes that are oriented parallel to the fixed cylindrical axis for the tunable lens or may have another desired appearance.

The left side of target 204 may be associated with a first cylindrical power (that is listed in description 206-1). The first cylindrical power may be a minimum cylindrical power. The right side of target 204 may be associated with a second cylindrical power (that is listed in description 206-2). The second cylindrical power may be a maximum cylindrical power.

The user of electronic device 10 may provide input that causes the tunable lens to set its cylindrical power within the range defined by the minimum and maximum cylindrical power. In one example, gaze input obtained by a gaze detection sensor may be used to update the tunable lens.

In FIG. 12, point of gaze 210 is aligned with the left-most side of target 204. While the point of gaze is aligned with the left-most side of target 204, the tunable lens may be adjusted to have the minimum cylindrical power associated with target 204. As the user's gaze direction changes gradually to the right, the cylindrical power of the tunable lens is updated based on a distance of the point of gaze between the left and right sides of target 204. For example, if the user gazes at a point that is 25% of the distance from the left side to the right side, the tunable lens may be updated to have a cylindrical power of −4.5 D. If the user gazes at a point that is 50% of the distance from the left side to the right side, the tunable lens may be updated to have a cylindrical power of −3.0 D. If the user gazes at a point that is 75% of the distance from the left side to the right side, the tunable lens may be updated to have a cylindrical power of −1.5 D.

In this way, the tunable lens may be continuously adjusted within the predetermined range based on the user's point of gaze. The user may be prompted to select the point of the target that appears the clearest. The user may scan the target with their point of gaze. The optical power of the tunable lens is updated as a function (e.g., a linear function) of the horizontal distance of the point of gaze.

With this type of arrangement, the user may intuitively and easily change the tunable lens within a range of cylindrical powers. After viewing the entire target, the user may assess which point on the target looks the clearest. The user may provide user input to select the point along the target that appears the clearest (which has an associated cylindrical power). The electronic device may use the selected cylindrical power to determine the user's optimal cylindrical power during operation of the electronic device 10.

If desired, additional visual content such as content 208 may be presented on display 14 simultaneously with the target 204. In general, content 208 may be a visual cue to influence the distance (depth) at which the user perceives the image content to be located. For example, content 208 (sometimes referred to as background content 208) may include one or more depth cues such as a horizon to suggest that the target 204 is far away and cause the user's eye to relax accommodation. Instead or in addition, content 208 may include stereoscopic content that causes the user to perceive the image content at a desired distance.

Figure 13:
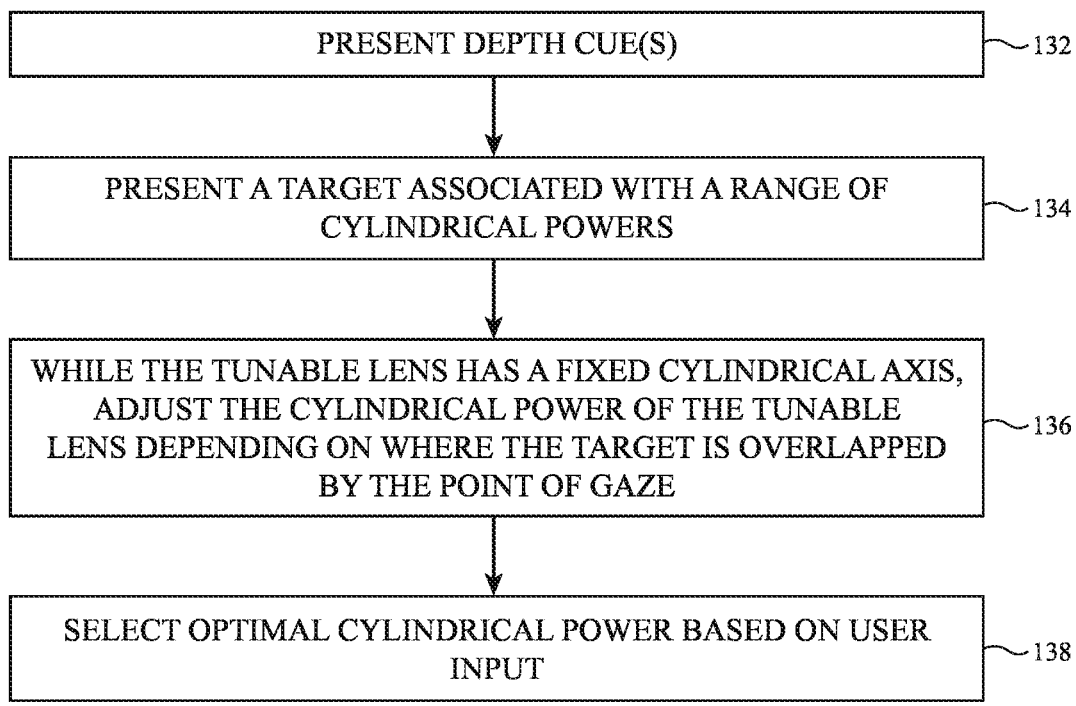
FIG. 13 is a flowchart of illustrative method steps for operating an electronic device with a tunable lens having adjustable cylindrical power using the target of FIG. 12 in accordance with various embodiments.

FIG. 13 is a flowchart of illustrative method steps for operating an electronic device with a tunable lens having adjustable cylindrical power. First, at step 132, the electronic device 10 may present one or more depth cues to set a perceived image distance (sometimes referred to as perceived image depth). As previously mentioned, the depth cues may include a horizon, stereoscopic content, etc. At step 134, display 14 may present a target associated with a range of cylindrical powers. The target may have an associated minimum cylindrical power on a first side of the target (e.g., the left side in FIG. 12) and an associated maximum cylindrical power on a second, opposing side of the target (e.g., the right side in FIG. 12). The target extends continuously from the first side to the second side. The target may include glyphs, stripes (e.g., horizontal stripes, vertical stripes, and/or diagonal stripes, etc.), and/or any other desired symbols or features. In general, the target may have any desired appearance. One or more cylindrical powers (e.g., the minimum and maximum cylindrical powers) may be displayed in a text description adjacent to the target if desired. If desired, the current cylindrical power being used by the tunable lens (and based on the point of gaze along the target) may be displayed in a description adjacent to the target.

At step 136, a gaze detection sensor (sometimes referred to as a gaze tracking sensor) may determine the point of gaze of the viewer on display 14. Electronic device 10 (e.g., control circuitry 12) may adjust the cylindrical power of the tunable lens depending on where the target is overlapped by the point of gaze. In the example of FIG. 12, the tunable lens is adjusted to have a cylindrical power of −6.0 D when the viewer looks at the left side of target 204, the tunable lens is adjusted to have a cylindrical power of 0.0 D when the viewer looks at the right side of target, the tunable lens is adjusted to have a cylindrical power of −3.0 D when the viewer looks at the center of target 204, etc. If the user is not looking at the target, the tunable lens may maintain the cylindrical power from the point on the target most recently viewed or may revert back to a default cylindrical power.

The example in step 136 of the tunable lens being updated based on gaze input is merely illustrative. Alternatively, the user may provide touch input (e.g., to a touch sensor), voice commands (e.g., to a microphone), button input (e.g., to a button or digital crown), and/or other desired input to change a selected point on the target. For example, a user may swipe a touch sensor to the right to cause a selected point on target 204 to change, may provide a voice command to cause a selected point on target 204 to change, may press a button to cause a selected point on target 204 to change, may rotate a button (e.g., a digital crown) to cause a selected point on target 204 to change, etc.

Finally, in step 138, an optimal cylindrical power of the presented options may be selected based on user input. The user may select the cylindrical power that causes the target to have the clearest appearance. For example, the user may scan target 204 to identify a given point on target 204 that appears the clearest. Accordingly, the user provides user input to select the given point on target 204 as the best option available.

The user may select their preferred point on the target using gaze input (e.g., by gazing at the preferred point on the target for longer than a given dwell time), touch input, a voice command, button input (e.g., to a button or digital crown), etc.

If desired, the method of FIG. 13 may be repeated multiple times until the optimal cylindrical power for the user is determined. For example, in a first iteration the target may have an associated range of a first magnitude. In a second iteration the target may have an associated range of a second magnitude that is smaller than the first magnitude. In other words, the first iteration may be a coarse adjustment and the second iteration may be a fine adjustment.

In general, any desired number of iterations of FIG. 13 may be performed to narrow in on the optimal cylindrical power for the user's eyesight.

It is noted that the method of FIG. 13 may be performed for a single eye of the user (since each eye may have different optimal cylindrical powers). In the eye that is not being tested, display 14 may present a solid background image and/or may present content with a similar appearance as the eye being tested to avoid user discomfort.

During the operations of FIG. 13, the spherical power and cylindrical axis may be kept constant.

The operations of FIG. 13 (with a target having a continuous range of optical power) have been described in connection with cylindrical power. However, it should be understood that the same techniques may instead or in addition be used to determine an optimal spherical power for the tunable lens.

Techniques have been described herein for determining an optimal spherical power for the tunable lens (as in FIGS. 6 and 7), determining an optimal cylindrical axis for the tunable lens (as in FIGS. 8 and 9), and determining an optimal cylindrical power for the tunable lens (as in FIGS. 10-13). These steps may be performed in that order (e.g., determining spherical power then cylindrical axis then cylindrical power) or another desired order. Of the three properties of interest for the tunable lens (e.g., spherical power, cylindrical axis, and cylindrical power), the two remaining properties are fixed when determining an optimal magnitude for one of the properties. If desired, the procedure of determining spherical power then cylindrical axis then cylindrical power may be repeated multiple times to fine tune the tunable lens for a user's eyesight.

For example, a first spherical power may be determined to be optimal while the cylindrical axis is fixed at 0 degrees and the cylindrical power is fixed at 0 D. Then, a first cylindrical axis is determined to be optimal while the spherical power is fixed at the first spherical power and the cylindrical power is fixed at 0 D. Then, a first cylindrical power is determined to be optimal while the spherical power is fixed at the first spherical power and the cylindrical axis is fixed at the first cylindrical axis. After this first round of adjustment, the tunable lens has the first spherical power, the first cylindrical axis, and the first cylindrical power. The process may be repeated using these properties to fine tune the tunable lens. For example, a second spherical power that is different than the first spherical power may be determined to be optimal while the cylindrical axis is fixed at the first cylindrical axis and the cylindrical power is fixed at the first cylindrical power (as determined in the first round of adjustments). Then, a second cylindrical axis that is different than the first cylindrical axis is determined to be optimal while the spherical power is fixed at the second spherical power and the cylindrical power is fixed at the first cylindrical power. Then, a second cylindrical power that is different than the first cylindrical power is determined to be optimal while the spherical power is fixed at the second spherical power and the cylindrical axis is fixed at the second cylindrical axis. After this second round of adjustment, the tunable lens has the second spherical power, the second cylindrical axis, and the second cylindrical power.

If desired, electronic device 10 may receive input from an additional user (e.g., an eyecare professional administering the assessment) using wired or wireless communications with an external electronic device or other desired inputs. The tunable lens may be adjusted based on these received user inputs.

Another technique for tuning an adjustable lens in an electronic device may be based on Scheiner's principle. Scheiner's principle is illustrated in FIGS. 14A-16B. As shown in FIG. 14A, a masking layer 224 may be positioned in front of eye 222. The mask 224 has two pinholes 226. Parallel light beams 228-1 and 228-2 are emitted through pinholes 226 towards the eye 222. FIG. 14A shows an example of emmetropia where the parallel beams are focused onto a single point. The perceived image seen by the eye in FIG. 14A is shown in FIG. 14B. As shown in FIG. 14B, a single point 228 is perceived when the two parallel beams are properly focused by the eye.

FIG. 15A shows an example of myopia (nearsightedness) where the parallel beams are focused onto two different points. The perceived image seen by the eye is shown in FIG. 15B. As shown in FIG. 15B, because the parallel beams are not properly focused by the eye, the first and second beams are distinguishable at respective first and second points.

FIG. 16A shows an example of hyperopia (farsightedness) where the parallel beams are focused onto two different points. The perceived image seen by the eye is shown in FIG. 16B. As shown in FIG. 16B, because the parallel beams are not properly focused by the eye, the first and second beams are distinguishable at respective first and second points.

Figure 17:
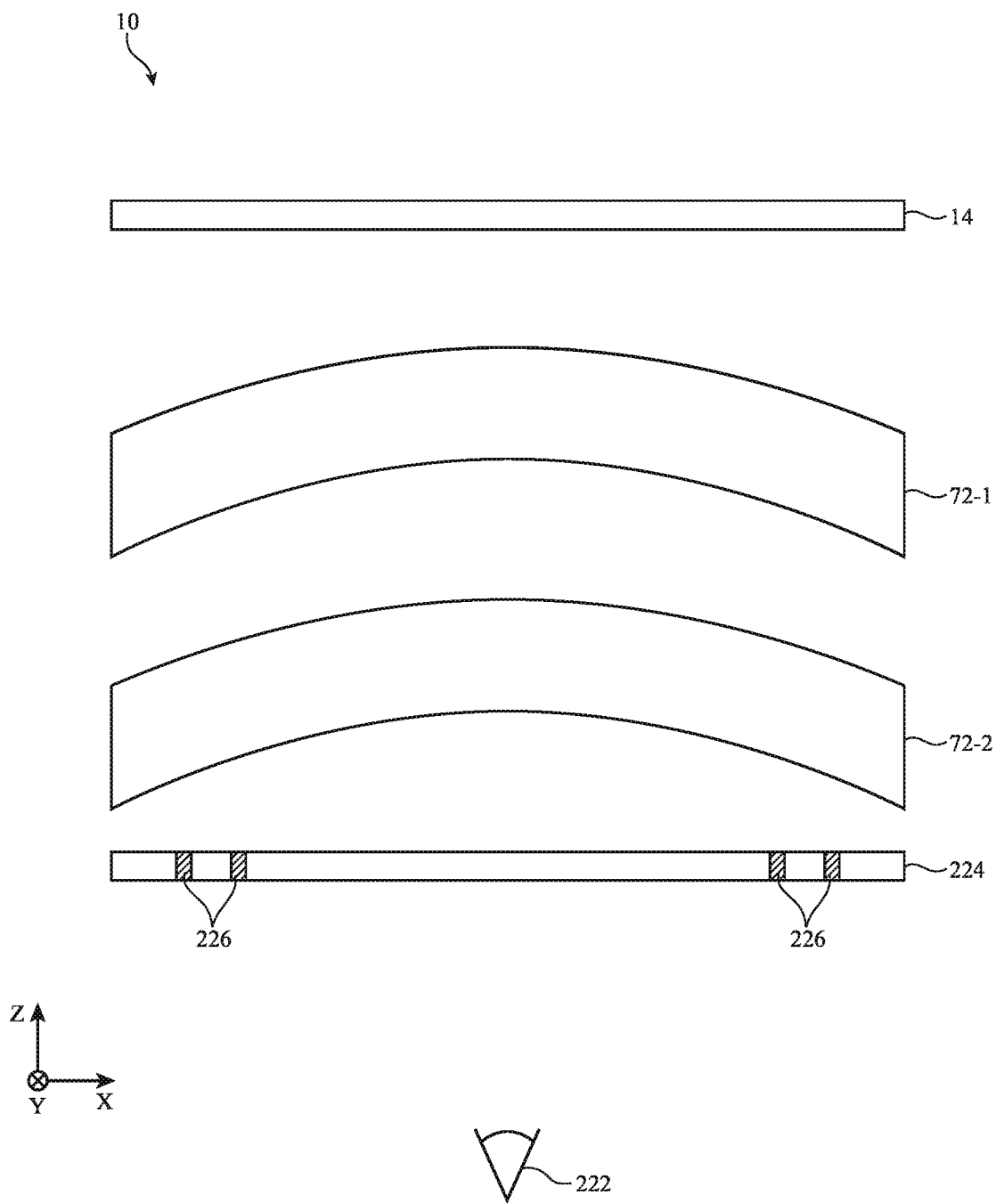
FIG. 17 is a side view of an illustrative electronic device with a masking layer having a ring of pinhole pairs in accordance with various embodiments.

Scheiner's principle may be leveraged to adjust a tunable lens in electronic device 10. In particular, an opaque layer with pinholes may be positioned between the adjustable lens and the user's eye. FIG. 17 shows an example with lens elements 72-1 and 72-2 positioned between display 14 and eye 222. As shown, masking layer 224 (sometimes referred to as opaque layer 224, light blocking layer 224, pinhole layer 224, etc.) is interposed between lens element 72-2 and eye 222. Masking layer 224 may be used to determine if the lens assembly including lens elements 72-1 and 72-2 is properly focusing light for the viewer.

Masking layer 224 may have one or more apertures that are aligned with infrared sensors used in gaze detection sensors. Instead or in addition, masking layer 224 may be transparent to infrared light to avoid impacting performance of the gaze detection sensor(s) in electronic device 10.

The example in FIG. 17 of masking layer 224 being interposed between the eye 222 and lens element 72-2 is merely illustrative. The masking layer 224 may instead be formed between display 14 and lens element 72-1 or may be integrated into the lens module 72.

In FIGS. 14A-16A, masking layer 224 includes a single pair of pinholes. The single pair of pinholes may measure whether light is properly focused along a single axis. To allow for simultaneous testing of whether light is properly focused along multiple axes, the masking layer 224 may instead include a ring of pinhole pairs as shown in the top view of FIG. 18.

Figure 18:
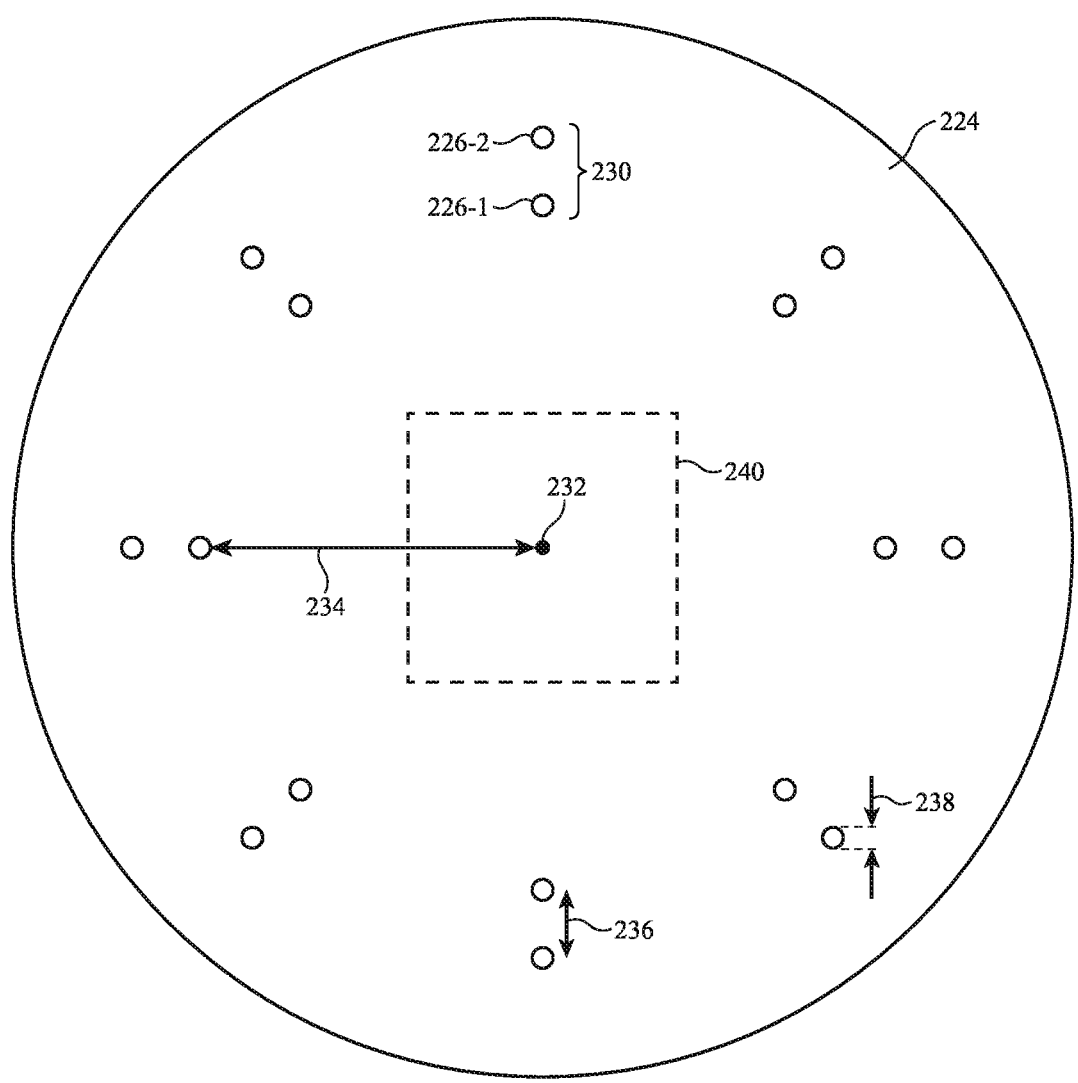
FIG. 18 is a top view of an illustrative masking layer having a ring of pinhole pairs in accordance with various embodiments.

As shown in FIG. 18, a plurality of pinhole pairs is distributed around a center 232. Center 232 may be a geometric center of masking layer 224 and/or may be aligned with a geometric center of the tunable lens element 72-2. These examples are merely illustrative. In general, the center 232 may be at any desired location. Each pinhole pair 230 includes a first pinhole 226-1 (sometimes referred to as aperture 226-1, opening 226-1, hole 226-1, etc.) and a second pinhole 226-2 (sometimes referred to as aperture 226-2, opening 226-2, hole 226-2, etc.). The first pinholes 226-1 may be closer to center 232 than the second pinholes 226-2. Pinholes 226-1 may therefore be referred to as inner pinholes whereas pinholes 226-2 may be referred to as outer pinholes.

Pinholes 226-1 may be arranged in a ring around center 232. In other words, distance 234 between center 232 and inner pinhole 226-1 is the same for each pinhole pair. Pinholes 226-2 may be arranged in a ring around center 232. The distance between center 232 and outer pinhole 226-2 is the same for each pinhole pair. For each pinhole pair, pinholes 226-1 and 226-2 may be separated by a center-to-center distance 236. Each pinhole may have a diameter 238. The diameter of pinholes 226-1 and 226-2 may be the same or may be different.

As one example, distance 234 may be 5 millimeters, distance 236 may be 2 millimeters, and diameter 238 may be 0.5 millimeters. This example is merely illustrative. Distance 234 may be greater than 2 millimeters, greater than 4 millimeters, greater than 6 millimeters, greater than 8 millimeters, less than 10 millimeters, less than 6 millimeters, etc. Distance 236 may be greater than 1 millimeter, greater than 2 millimeters, greater than 3 millimeters, less than 5 millimeters, less than 3 millimeters, etc. Distance 238 may be greater than 0.1 millimeters, greater than 0.3 millimeters, greater than 0.5 millimeters, less than 2 millimeters, less than 1 millimeter, etc.

It may be desirable for distance 236 to be as large as possible while ensuring the light from both pinholes reaches the pupil of the viewer. In embodiments where the position of the pinholes is adjustable, distance 236 may be modified based on a measured pupil size of the viewer's eye. If the pupil has a larger diameter, distance 236 may be increased and if the pupil has a small diameter, distance 236 may be decreased. In embodiments where the position of the pinholes is adjustable, the position of center 232 may be adjusted to ensure that the light passing through the pinholes enters the user's pupil.

Masking layer 224 may be formed from any desired material. In one possible arrangement, masking layer 224 is formed from an adjustable liquid crystal layer. The adjustable liquid crystal layer may include, as an example, a twisted nematic (TN) liquid crystal matrix that is interposed between first and second linear polarizers. If the adjustable liquid crystal layer receives polarized light, one of the linear polarizers may optionally be omitted. A transparent conductive layer (e.g., indium tin oxide) may be included to selectively apply voltage to the liquid crystal matrix. The adjustable liquid crystal layer may be pixelated to allow the position of the pinholes to be adjusted in real time. Some portions of the adjustable liquid crystal layer may be set to be opaque to incident light (e.g., with a transmittance of less than 10%, less than 5%, less than 3%, etc.) while other portions of the adjustable liquid crystal layer may be set to be transparent to incident light to create the pinholes. The transparency of the pinholes in this example may be greater than 70%, greater than 90%, greater than 95%, greater than 98%, etc.). Instead of a dynamically adjustable liquid crystal layer, the masking layer 224 may be a static liquid crystal layer where the position of the pinholes regions is fixed. As yet another alternative, masking layer 224 may be formed from an opaque material (e.g., a black plastic or other desired material with physical holes to create the transparent pinholes).

When the masking layer 224 comprises an adjustable liquid crystal layer, the masking layer 224 may be permanently fixed in display module 70. During an assessment of the tunable lens and the user's eyesight, the masking layer may be adjusted to have pinholes of the type shown in FIG. 18. During a normal operating mode (when an assessment of the tunable lens and the user's eyesight is not being performed), the entire masking layer may be adjusted to be transparent (and therefore not adversely impact the optical performance of the electronic device).

When the masking layer 224 is not adjustable, the masking layer 224 may be a removable masking layer that is temporarily coupled to display module 70. The masking layer 224 may have one or more attachment features (e.g., magnets, protrusions, recesses, clips, etc.) that are configured to mate with corresponding attachment features of electronic device 10 to temporarily position the masking layer 224 in a desired location within electronic device 10.

Masking layer 224 may optionally have a central opening 240 that allows displayed content to be visible through a middle of the masking layer. For example, prompts or other user interface elements associated with testing the user's eyesight may be displayed through central opening 240.

During a test of the user's eyesight and tunable lens 72-2, dots may be displayed on display 14 that are visible through pinholes 226. Color filter elements may optionally be included in the pinholes if desired. For example, the display may present white dots, the inner pinholes may include color filter elements of a first color, and the outer pinholes may include color filter elements of a second color that is different than the first color. To ensure that the dots on display 14 reach a user's pupil, beam steering may be performed. Beam steering may include moving the position of the dots on display 14 (e.g., when the position of the pinholes in masking layer 224 are fixed), moving the position of the pinholes when masking layer 224 is adjustable, or a combination of these techniques. The beam steering may be performed based on a position of the user's pupil(s) as detected by a gaze detection sensor.

Figure 19:
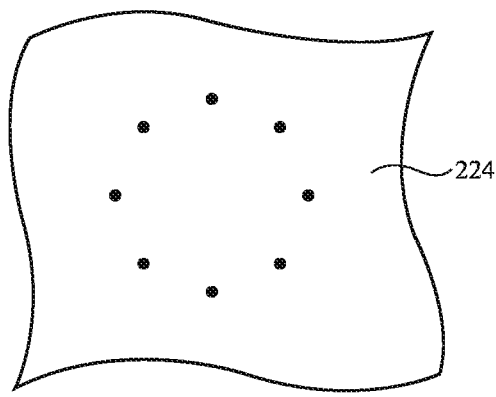
FIG. 19 is a view of the image perceived by the eye in FIG. 17 when the tunable lens is properly focused to compensate for the user's eyesight in accordance with various embodiments.
Figure 20:
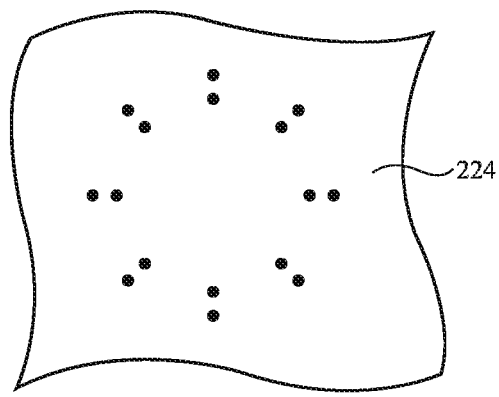
FIG. 20 is a view of the image perceived by the eye in FIG. 17 when the tunable lens has a spherical aberration relative to the user's eyesight in accordance with various embodiments.

If the tunable lens 72-2 has optical power that properly compensates for the user's eyesight, the user will perceive a ring of single dots as shown in FIG. 19. If the tunable lens 72-2 has optical power that does not properly compensate for the user's eyesight (due to a spherical aberration), the user will perceive a ring of discrete pinhole pairs as shown in FIG. 20. When two discrete dots are visible for each pinhole pair as in FIG. 20 (and color filter elements are included in the pinholes), the color of the inner ring of dots may indicate whether more or less optical power is required to compensate for the user's eyesight.

Figure 21:
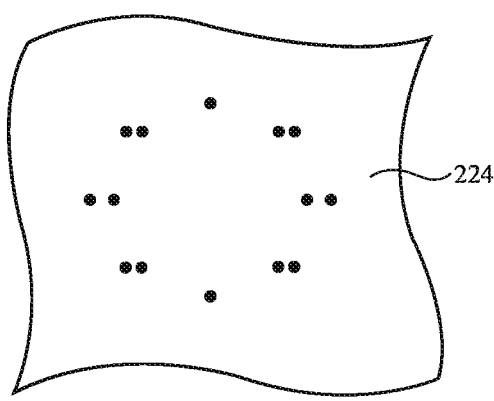
FIG. 21 is a view of the image perceived by the eye in FIG. 17 when the tunable lens has a cylindrical aberration relative to the user's eyesight in accordance with various embodiments.

If the tunable lens 72-2 has optical power that does not properly compensate for the user's eyesight (due to a cylindrical aberration), the user will perceive a varying distance between the pinhole pairs as shown in FIG. 21. Some users may have astigmatism, where the curvature of the eye is different in one direction than another other. If tunable lens 72-2 only has spherical power, an eye with astigmatism may perceive single dots (indicating proper focus) at certain points around the ring and pairs of dots (indicating improper focus) at other points around the ring. The location around the ring with the single dots and/or the locations around the ring with the most displacement between pairs of dots may be used to determine a cylindrical axis for the tunable lens 72-2.

Figure 22:
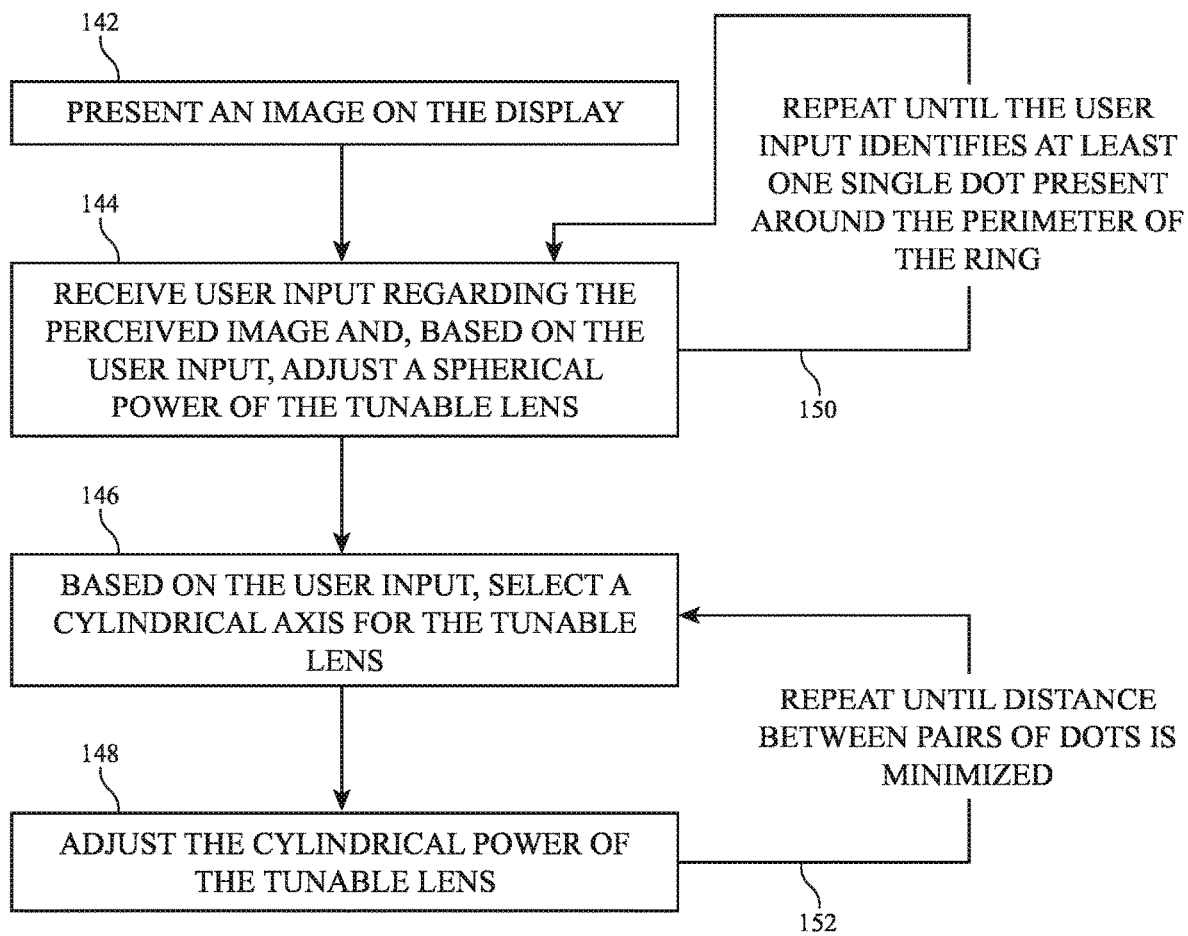
FIG. 22 is a flowchart of illustrative method steps performed by an electronic device with a masking layer having a plurality of pinhole pairs in accordance with various embodiments.

FIG. 22 is a flowchart of illustrative method steps performed by an electronic device with a masking layer having a plurality of pinhole pairs. At step 142, the electronic device may present an image on display 14. The image may be viewed by a user through lens module 72 and a masking layer 224. The masking layer may have a ring of transparent pinhole pairs that allow light from display 14 to pass. The rest of the masking layer may be opaque and blocks light from display 14. The image presented on display 14 may include one dot of light aligned with each pinhole pair in masking layer 224. The example of pinhole pairs distributed in a ring around masking layer 224 is merely illustrative. If desired, groups of three or more pinholes may be distributed around masking layer 224. Using three or more pinholes per group may accommodate small pupils while offering greater sensitivity to users with larger pupils.

At step 144, the electronic device 10 may receive user input regarding the image perceived by the user. The user may provide user input indicating whether they perceive a ring of single dots or a ring of pairs of dots. If the user perceives a ring of pairs of dots, the user may provide user input identifying the color of the inner ring of dots. Based on the user input, the electronic device 10 may adjust (e.g., increase or decrease) a spherical power of tunable lens 72-2.

After adjusting the spherical power of the tunable lens, step 144 may be repeated as indicated by loop 150 until the user input identifies at least one single dot present around the perimeter of the ring of dots.

Instead of electronic device 10 (e.g., control circuitry 12) estimating a new spherical power for the tunable lens based on the user input, the user may provide input (e.g., rotating a digital crown, a hand gesture, etc.) that adjusts the spherical power of the tunable lens until at least one of the dot pairs is aligned. Once one of the dot pairs is aligned, the user may provide input indicating that this is the case.

Next, at step 146, the user may provide input indicating whether all of the dots around the ring are single dots or whether some of the dots are single dots and some of the dots are pairs of dots. If all of the dots are single dots then the tunable lens 72-2 is properly compensating for the user's eyesight and no further action is required. If some but not all of the dots are single dots the user may provide user input indicating which dots are single dots and/or which pairs of dots have the greatest separation. In response to this user input, the electronic device 10 may set a cylindrical axis for the tunable lens. Next, at step 148, the electronic device 10 may adjust the cylindrical power of the tunable lens. The cylindrical power may be adjusted based on user input (e.g., user input identifying the maximum distance between pairs of dots, the color of the inner ring of dots, etc.). As shown by loop 152, steps 146 and 148 may be repeated until the distance between pairs of dots is minimized around the ring of dots (e.g., ideally until there is a ring of single dots indicating proper focus in the optical system).

Instead of electronic device 10 (e.g., control circuitry 12) estimating a new cylindrical power for the tunable lens based on the user input, the user may provide input (e.g., rotating a digital crown, a hand gesture, etc.) that adjusts the cylindrical power of the tunable lens until all of the dot pairs are aligned. Once all of the dot pairs are aligned, the user may provide input indicating that this is the case.

The user may provide user input at steps 144, 146, and/or 148 using gaze input, touch input, a voice command, button input (e.g., to a button or digital crown), etc. As specific examples, the user may use a voice command to indicate whether or not a single ring of dots is visible at step 144, may use gaze input to identify a pair of dots with the greatest separation at step 146, and may use a button input to indicate whether or not a single ring of dots is visible at step 148.

During the method of FIG. 22, electronic device 10 may provide prompts using any desired output device(s). As previously mentioned, masking layer 224 may have a central opening 240 that allows visible content to be displayed in a center of the ring of dots during the operations of FIG. 22. The content in central opening 240 may include text instructions, an arrow that the user rotates to point at a single dot or a pair of dots with maximum separation, or any other desired content. In addition to visible content via display 14, electronic device 10 may present audio instructions using a speaker if desired.

As one example, during the operations of FIG. 22 a tunable lens may have a spherical power of 0 during a first test at step 142 and 144. At step 144, a speaker in electronic device 10 may state a question for the user: "Is there a single dot included around the ring of dots?" If the user answers no, the speaker in electronic device 10 may state a question for the user "What color is the inner ring of dots?" Based on the user input, the spherical power of the tunable lens may be updated to −2.0 D. The speaker again states: "Is there a single dot included around the ring of dots?" If the user answers yes, the method proceeds to step 146 and the speaker in electronic device 10 may state an instruction for the user "adjust the arrow to point at the pair of dots with the greatest separation." The user uses gaze input and/or button input to adjust an arrow (that is visible through central opening 140) to point at the appropriate pair of dots. In response, electronic device selects a cylindrical axis for tunable lens 72-2. The electronic device may select a starting cylindrical power for the tunable lens of −1.0 D (as one example). Next, at step 148, a speaker in electronic device 10 may state a question for the user: "Is there a pair of dots included around the ring of dots?" If the user answers yes then steps 146 and/or 148 may be repeated until only single dots are perceived around the ring (or until the distance between dots around the ring is minimized as much as possible).

Instead of having the user provide subjective feedback regarding the alignment of the dots, one or more external cameras may observe the retina of the eye and objectively tune the tunable lens without explicit user intervention.

It is noted that the method of FIG. 22 may be performed for a single eye of the user (since each eye may have different optimal cylindrical powers). In the eye that is not being tested, display 14 may present a solid background image and/or may present content with a similar appearance as the eye being tested to avoid user discomfort.

Figure 23:
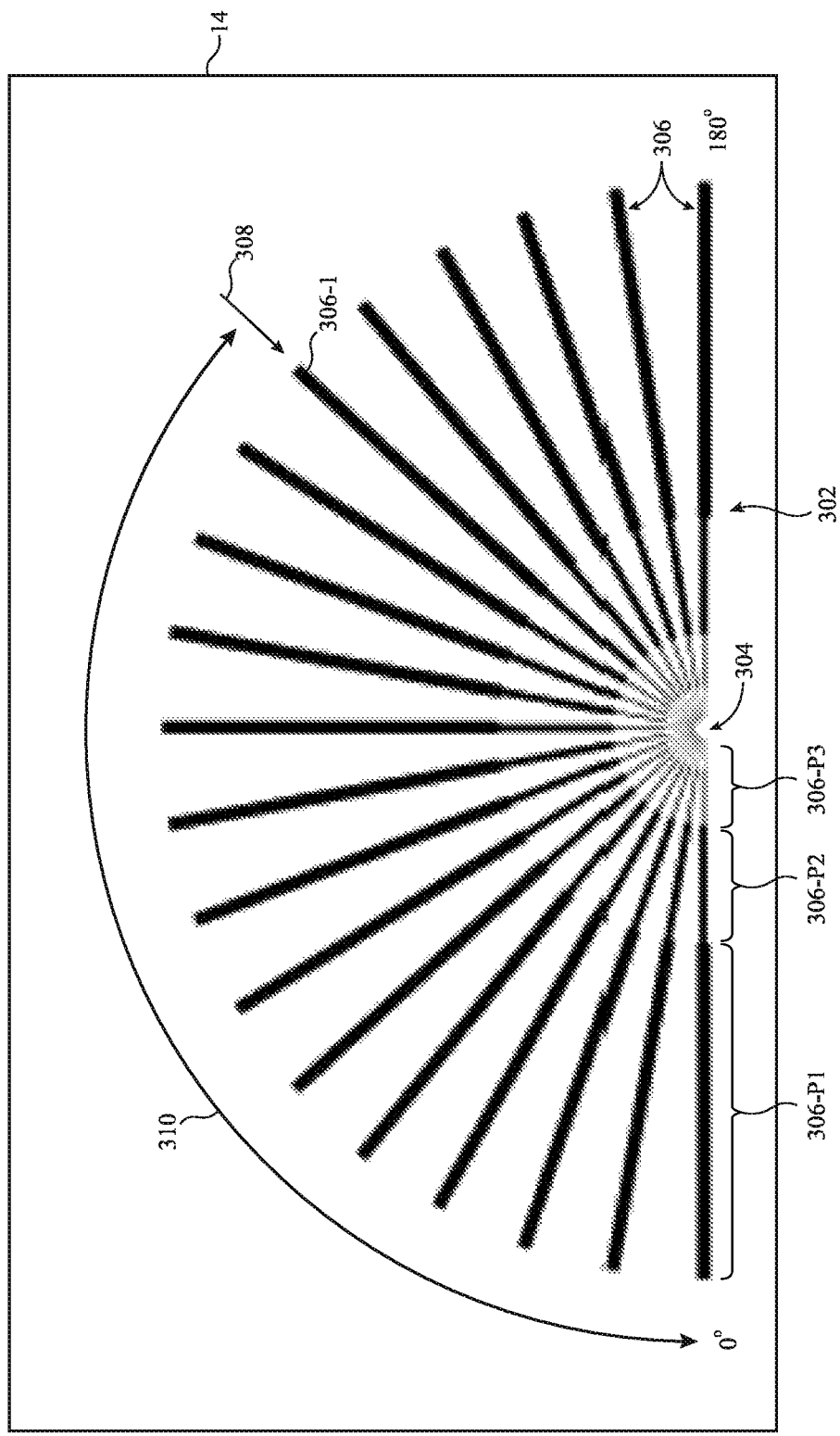
FIGS. 23 and 24 are top views of illustrative displays that presents a test chart with visual elements extending radially outward from a common point in accordance with various embodiments.

Another possible user interface for adjusting a tunable lens is shown and discussed in connection with FIGS. 23-25. As shown in FIG. 23, a test chart 302 is displayed on display 14. Test chart 302 includes a plurality of lines 306 or other visual elements that extend radially away from a common point 304 (sometimes referred to as center 304). Lines 306 (sometimes referred to as visual elements 306) may be evenly spaced (e.g., at 10 degree intervals) to create a semicircle footprint with lines evenly distributed across the semicircle.

If desired, each visual element may be a line. Alternatively, the visual elements may be selected such that the semicircle footprint has the appearance of a peacock tail, paper fan, sun, or other real-world object. As shown in FIG. 23, the lines 306 may have a decreasing thickness towards the center 304 if desired. As shown in FIG. 23, each line 306 may have a first portion 306-P1 with a first thickness, a second portion 306-P2 with a second thickness, and a third portion 306-P3 with a third thickness (where each portion is progressively closer to center 304). The first thickness is greater than the second thickness and the second thickness is greater than the third thickness.

During adjustment of a tunable lens element, the spherical power of the tunable lens element may be scanned from a maximum magnitude towards a minimum magnitude. This pace of this scan may be determined by electronic device 10 and/or may be controlled by the user (e.g., the user may speed up the rate of change, slow down the rate of change, temporarily reverse the rate of change, etc.).

As the spherical power is gradually reduced from a maximum spherical power to a minimum spherical power, the test chart 302 will gradually come into focus for the user. For users with astigmatism, the lines will at some point become more focused (e.g., more black in the event that the lines are solid black lines) along a single direction than in other directions. For example, in FIG. 23, line 306-1 becomes more black than the surrounding lines when the spherical power has a first magnitude.

The user may provide input to identify line 306-1 as the most focused line at this time. As shown in FIG. 23, a symbol 308 may be displayed in addition to test chart 302. Symbol 308 may be an arrow, a pointing hand, or any other desired icon or image. The symbol may identify one of the lines 306 that is currently being targeted (e.g., line 306-1 in FIG. 23).

The targeted line may be selected based on user input. For example, gaze input from the user may determine the targeted line in the test chart. When a user's point of gaze overlaps a given line, that line is selected as being targeted and the position of symbol 308 is adjusted to indicate the selected line. As another example, a user may perform hand gestures (e.g., pointing to the right or left) that are detected by electronic device 10 and used to move symbol 308 (and the targeted line). Symbol 308 may provide feedback to the user to ensure that the line perceived by the user as most focused is accurately selected.

Electronic device 10 may record the spherical power when the user selects the line 306-1. Electronic device 10 may also record the angle 310 associated with line 306-1.

The scan of the spherical power from the maximum magnitude to a minimum magnitude may then continue. At some point, the lines will again become more focused (e.g., more black in the event that the lines are solid black lines) along a single direction. For example, in FIG. 24, line 306-2 becomes more black than the surrounding lines when the spherical power has a second magnitude. Since the magnitude of the spherical power only decreases between FIGS. 23 and 24, the second magnitude (from FIG. 24) is less than or equal to the first magnitude (from FIG. 23).

The user may provide input to identify line 306-2 at this time. The line may be selected based on user input. For example, gaze input from the user may determine the targeted line in the test chart. When a user's point of gaze overlaps a given line, that line is selected as being targeted and the position of symbol 308 is adjusted to indicate the selected line. As another example, a user may perform hand gestures (e.g., pointing to the right or left) that are detected by electronic device 10 and used to move symbol 308 (and the targeted line).

Electronic device 10 may record the spherical power when the user selects the line 306-2. Electronic device 10 may also record the angle 312 associated with line 306-2.

Figure 24:
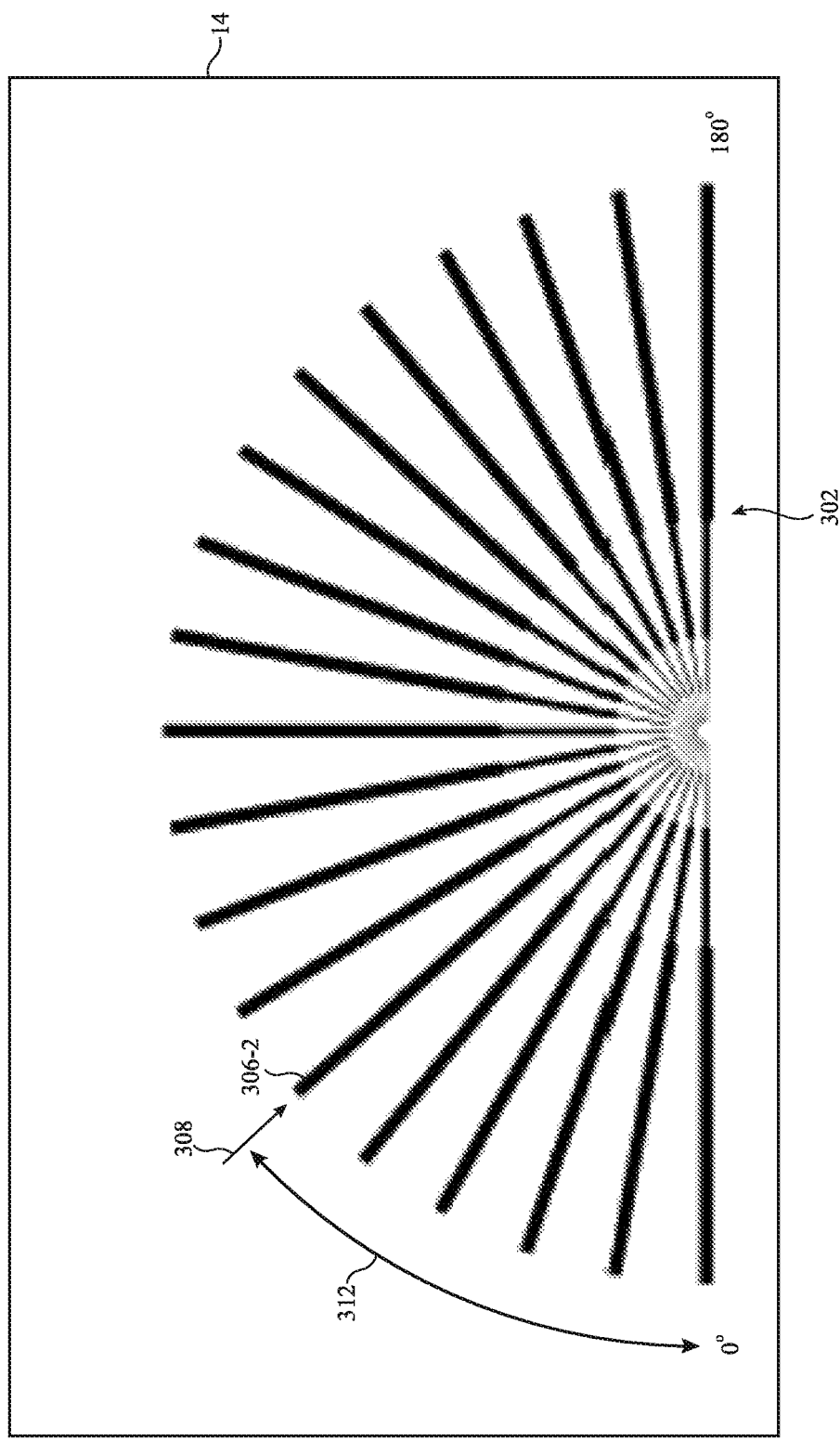

To summarize, the technique shown in FIGS. 23 and 24 results in the head-mounted device obtaining a first spherical power (from FIG. 23 when the user identifies a first line that becomes more focused than adjacent lines), a first angle (e.g., angle 310 from FIG. 23 that is associated with the angle of the first line that is the most focused), a second spherical power (from FIG. 24 when the user identifies a second line that becomes more focused than adjacent lines), and a second angle (e.g., angle 312 from FIG. 24 that is associated with the angle of the second line that is the most focused).

For subsequent operation of electronic device 10, the spherical power of the tunable lens is set equal to the first spherical power, the cylindrical power of the tunable lens is set equal to the difference between the first and second spherical powers, and the cylindrical axis is set equal to an average of 1) the first angle and 2) the second angle minus 90 degrees.

Figure 25:
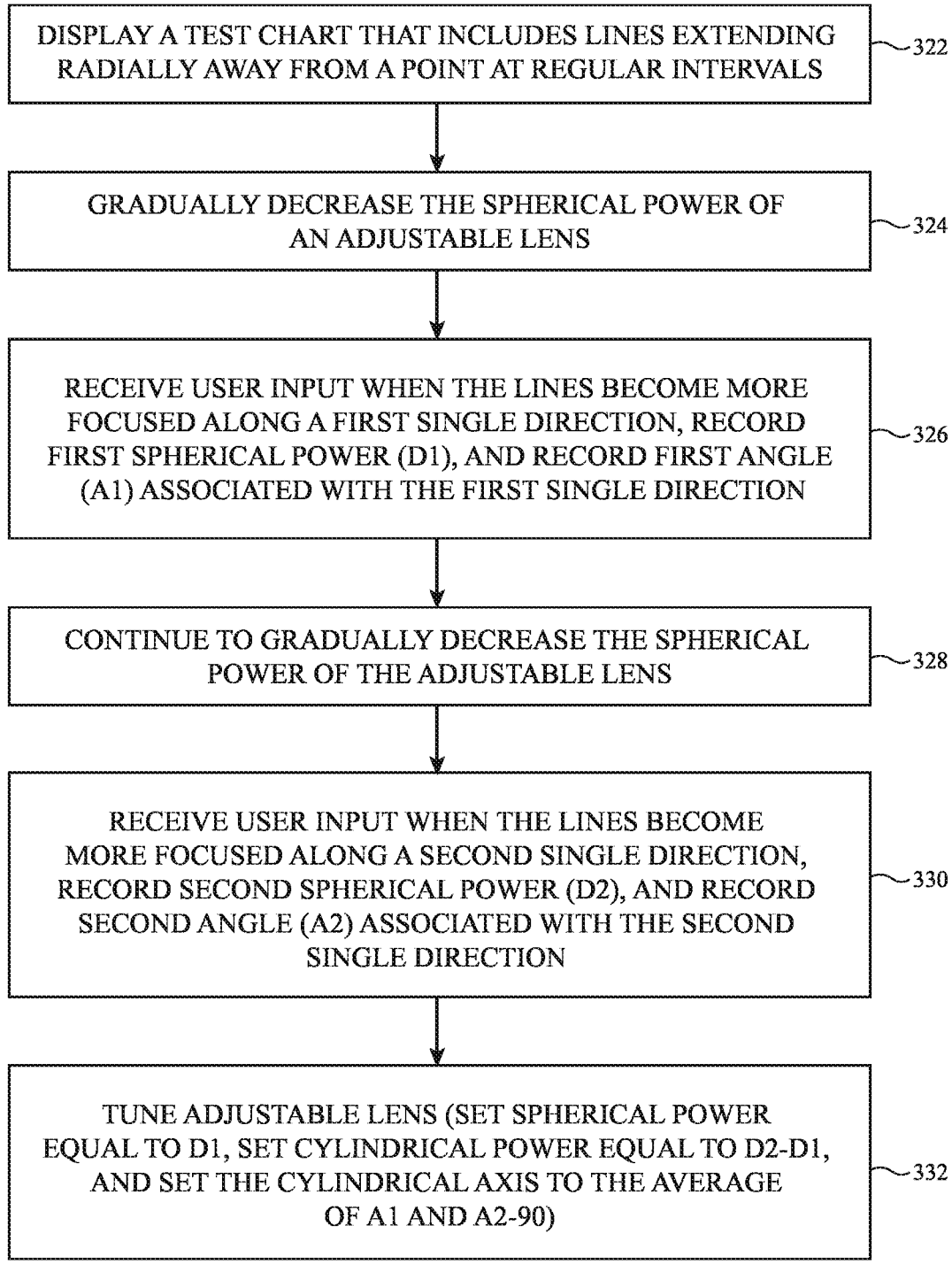
FIG. 25 is a flowchart of illustrative method steps for operating an electronic device with a display that presents the test chart of FIGS. 23 and 24 in accordance with various embodiments.

FIG. 25 is a flowchart of illustrative method steps that may be performed by an electronic device displaying a test chart of the type shown in FIGS. 23 and 24. At step 322, display 14 may display a test chart such as test chart 302 from FIGS. 23 and 24. Test chart 302 includes lines or other visual elements that extend radially away from a point (e.g., center point 304) at regular intervals. In other words, the angle between each line is the same (e.g., 10 degrees or another desired angle). In the example of FIGS. 23 and 24, there are 19 lines at 10 degree intervals to form a semicircle footprint.

At step 324, electronic device 10 may set the spherical power of the adjustable lens to a maximum spherical power and then gradually decrease the spherical power over time. The user may optionally provide user input to adjust the spherical power scan at step 324.

At step 326, electronic device 10 may receive user input when the lines of test chart 302 become more focused along a first single direction than other adjacent directions. In the example of FIG. 23, line 306-1 becomes more focused than the adjacent lines. When the user provides the user input at step 326, the spherical power at the time of the user input is recorded as a first spherical power D1. The angle (A1) of the selected line is also recorded (see angle 310 in FIG. 23). The user input may be provided at step 326 using gaze input, hand gestures, or other desired user sensors or components in electronic device 10.

At step 328, electronic device 10 may continue to gradually decrease the spherical power over time (e.g., starting at D1 from step 326). The user may optionally provide user input to adjust the spherical power scan at step 328.

At step 330, electronic device 10 may receive user input when the lines of test chart 302 become more focused along a second single direction than other adjacent directions. In the example of FIG. 24, line 306-2 becomes more focused than the adjacent lines. When the user provides the user input at step 330, the spherical power at the time of the user input is recorded as a second spherical power D2. The angle (A2) of the selected line is also recorded (see angle 312 in FIG. 24). The user input may be provided at step 330 using gaze input, hand gestures, or other desired user sensors or components in electronic device 10.

Finally, at step 332, the adjustable lens may be tuned based on the user inputs at steps 326 and 330. In particular, the spherical power may be set equal to D1 from step 326. The cylindrical power may be set equal to D2−D1. The cylindrical axis may be set to the average of 1) A1 and 2) A2 minus 90 degrees. Using these values in the tunable lens should result in a focused image for the user.

It is noted that, if the user does not have astigmatism, D1 may be approximately equal to D2. In this case, the cylindrical power selected at step 332 is 0 and the spherical power selected at step 332 is D1. The methods of FIGS. 7, 9, 11, 13, 22, and 25 may be performed once to tune a first tunable lens for a left eye and a second time to tune a second tunable lens for a right eye.

It is noted that the virtual image distance (VID) associated with each lens module 72 may be fixed or may be adjustable. Any desired virtual image distance may be used during the methods of FIGS. 7, 9, 11, 13, 22, and 25.

The foregoing is merely illustrative and various modifications can be made to the described embodiments. The foregoing embodiments may be implemented individually or in any combination.

What is claimed is:

1. An electronic device, comprising:
   a display that is configured to present a target that extends from a first side to a second opposing side, wherein the first side of the target is associated with a first optical power, the second side of the target is associated with a second optical power, and a region of the target between the first and second sides is associated with a continuous range of optical powers between the first and second optical powers;
   a gaze detection sensor configured to determine a point of gaze; and
   a tunable lens through which the display is viewable, wherein the tunable lens has an optical power that is set based on the point of gaze relative to the target.

2. The electronic device defined in claim 1, wherein the optical power is set based on the point of gaze relative to the first and second sides.

3. The electronic device defined in claim 2, wherein the optical power is set to a first magnitude when the point of gaze overlaps the first side and wherein the optical power is set to a second magnitude when the point of gaze overlaps the second side.

4. The electronic device defined in claim 3, wherein the display is further configured to present a description of the first magnitude adjacent to the first side and a description of the second magnitude adjacent to the second side.

5. The electronic device defined in claim 3, wherein the gaze detection sensor is configured to identify a user selected point along the target.

6. The electronic device defined in claim 3, further comprising:
   an input device that is configured to identify a user selected point along the target.

7. The electronic device defined in claim 6, wherein the input device comprises a microphone.

8. The electronic device defined in claim 6, wherein the input device comprises a touch sensor.

9. The electronic device defined in claim 6, wherein the input device comprises a button.

10. The electronic device defined in claim 1, wherein the target includes glyphs or stripes.

11. The electronic device defined in claim 1, wherein the optical power is set as a function of the point of gaze within the target.

12. The electronic device defined in claim 1, wherein the display is configured to present background content in addition to the target.

13. The electronic device defined in claim 12, wherein the background content includes a depth cue.

14. The electronic device defined in claim 1, wherein the optical power is a spherical power or a cylindrical power.

15. The electronic device defined in claim 1, wherein the second optical power is different than the first optical power.

16. An electronic device, comprising:
   a display configured to present an image through a masking layer with a ring of pinhole pairs;
   a tunable lens through which the display is viewable; and
   an input device configured to receive user input regarding a perceived image associated with the display and the masking layer.

17. The electronic device defined in claim 16, wherein the user input identifies whether pairs of dots or single dots are perceived around the ring.

18. The electronic device defined in claim 16, wherein the masking layer has a central opening in addition to the ring of pinhole pairs.

19. The electronic device defined in claim 16, wherein the masking layer is selectively attached to the electronic device.

20. The electronic device defined in claim 16, wherein the masking layer comprises an adjustable liquid crystal layer.

21. A method of operating an electronic device with a display, a tunable lens that is aligned with the display, and a gaze detection sensor, the method comprising:
   using the display, presenting multiple targets associated with respective spherical powers;
   based on a point of gaze that is obtained using the gaze detection sensor, wherein the point of gaze is overlapping a target of the multiple targets, adjusting a spherical power of the tunable lens to have the respective spherical power of the target;
   receiving user input that identifies a preferred target of the multiple targets; and
   based on the user input, adjusting the spherical power of the tunable lens to have the respective spherical power of the preferred target.

22. A method of operating an electronic device with a display and a tunable lens that is aligned with the display, the method comprising:
   using the display, presenting a test chart that comprises multiple visual elements that connect to and extend radially outward from a common point;
   gradually changing a spherical power of the tunable lens; and
   based on user input, selecting an optimal spherical power for the tunable lens, an optimal cylindrical power for the tunable lens, and an optimal cylindrical axis for the tunable lens.

23. The method defined in claim 22, wherein the user input comprises selecting a visual element of the multiple visual elements, the method further comprising:

based on user input, recording an angle associated with the visual element.

* * * * *